US009252954B2

(12) United States Patent
Halevi et al.

(10) Patent No.: US 9,252,954 B2
(45) Date of Patent: *Feb. 2, 2016

(54) EFFICIENT HOMOMORPHIC ENCRYPTION SCHEME FOR BILINEAR FORMS

(71) Applicant: International Business Machines Corporation, Armonk, NY (US)

(72) Inventors: Shai Halevi, Elmsford, NY (US); Craig B. Gentry, New York, NY (US); Vinod Vaikuntanathan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/511,507

(22) Filed: Oct. 10, 2014

(65) Prior Publication Data
US 2015/0033033 A1    Jan. 29, 2015

Related U.S. Application Data

(63) Continuation of application No. 12/749,944, filed on Mar. 30, 2010, now Pat. No. 8,861,716.

(51) Int. Cl.
*H04K 1/00* (2006.01)
*H04L 9/30* (2006.01)
(Continued)

(52) U.S. Cl.
CPC *H04L 9/30* (2013.01); *H04L 9/008* (2013.01); *H04L 9/0861* (2013.01); *H04L 2209/24* (2013.01)

(58) Field of Classification Search
CPC ... H04L 2209/24; H04L 9/008; H04L 9/0861; H04L 9/30
USPC .............................................. 380/28, 30, 277
See application file for complete search history.

(56) References Cited

U.S. PATENT DOCUMENTS 4,405,829 A    9/1983    Rivest et al.
6,530,020 B1    3/2003    Aoki
(Continued)

FOREIGN PATENT DOCUMENTS

| CN | 101645777 A | 2/2010 |
|---|---|---|
| JP | 62132451 | 6/1987 |
| JP | 2009186950 A | 8/2009 |

OTHER PUBLICATIONS

R. Yoshida et al.; "On the Private Searching over Encrypted Data—Does PKE really allow PIR?"; Oct. 31, 2007; Information Processing Society of Japan, Computer Security Symposium, No. 10; pp. 295-300.

(Continued)

*Primary Examiner* — Samson Lemma
(74) *Attorney, Agent, or Firm* — Harrington & Smith; Louis J. Percello

(57) ABSTRACT

In one exemplary embodiment, a computer readable storage medium tangibly embodying a program of instructions executable by a machine for performing operations including: receiving information B to be encrypted as a ciphertext C in accordance with an encryption scheme having an encrypt function; and encrypting B in accordance with the encrypt function to obtain C, the scheme utilizes at least one public key A, where B, C, and A are matrices, the encrypt function receives as inputs A and B and outputs C as $C \leftarrow AS+pX+B$ (mod q), S is a random matrix, X is an error matrix, p is in integer, q is an odd prime number. In other exemplary embodiments, the encryption scheme includes a decrypt function that receives as inputs at least one private key T (a matrix) and C and outputs B as $B = T^{-1} \cdot (TCT^t \mod q) \cdot (T^t)^{-1} \mod p$.

18 Claims, 8 Drawing Sheets

(51) Int. Cl.
H04L 9/00 (2006.01)
H04L 9/08 (2006.01)

(56) References Cited

U.S. PATENT DOCUMENTS

| | | | |
|---|---|---|---|
| 7,054,444 | B1 | 5/2006 | Paillier |
| 7,500,111 | B2 | 3/2009 | Hacigumus et al. |
| 7,640,432 | B2 | 12/2009 | Gennaro et al. |
| 7,856,100 | B2 | 12/2010 | Wang et al. |
| 7,869,598 | B2 | 1/2011 | Kerschbaum |
| 7,877,410 | B2 | 1/2011 | Staddom et al. |
| 8,249,250 | B2 * | 8/2012 | Rane et al. .............. 380/28 |
| 8,515,058 | B1 | 8/2013 | Gentry |
| 2002/0103999 | A1 | 8/2002 | Camnisch et al. |
| 2002/0164035 | A1 | 11/2002 | Yokota et al. |
| 2003/0172262 | A1 | 9/2003 | Curry |
| 2005/0120233 | A1 | 6/2005 | Halcrow et al. |
| 2005/0193048 | A1 | 9/2005 | Vaudenay et al. |
| 2006/0015946 | A1 | 1/2006 | Yagawa |
| 2006/0262933 | A1 | 11/2006 | Furukawa |
| 2007/0140479 | A1 | 6/2007 | Wang et al. |
| 2007/0156586 | A1 | 7/2007 | Kerschbaum |
| 2007/0192864 | A1 | 8/2007 | Bryant et al. |
| 2008/0010467 | A1 | 1/2008 | Kerschbaum et al. |
| 2008/0037774 | A1 | 2/2008 | Slavin .............. 380/30 |
| 2008/0226066 | A1 | 9/2008 | Yi et al. |
| 2008/0294909 | A1 | 11/2008 | Ostrovsky et al. |
| 2009/0062942 | A1 | 3/2009 | Smaragdis et al. |
| 2009/0103721 | A1 * | 4/2009 | Sada et al. .............. 380/42 |
| 2009/0138459 | A1 | 5/2009 | Walter et al. |
| 2009/0268908 | A1 * | 10/2009 | Bikel et al. .............. 380/255 |
| 2009/0327748 | A1 | 12/2009 | Agrawal et al. |
| 2010/0329448 | A1 * | 12/2010 | Rane et al. .............. 380/28 |
| 2011/0110525 | A1 * | 5/2011 | Gentry .............. 380/285 |
| 2012/0039473 | A1 * | 2/2012 | Gentry et al. .............. 380/277 |
| 2012/0066510 | A1 * | 3/2012 | Weinman .............. 713/189 |

OTHER PUBLICATIONS

T. Kobayashi et al.; "Anonymous Hierarchical Identity-Based Encryption and it's application"; Jan. 23, 2009; SCS 2009, 1C2-4; pp. 1-6.
M. Van Dijk et al.; "Fully Homomorphic Encryption over the Integers"; Cryptology ePrint Archive: Report 2009/616, Version: 20091214:101936; Dec. 11, 2009; pp. 1-25; Retrieved from the Internet: https://eprint.iacr.org/eprint-bin/getfile.pl?entry=2009/616 &version=20091214:101936&file=616.pdf.
J. Black, P. Rogaway, T. Shrimpton. Encryption-Scheme Security in the Presence of Key-Dependent Messages. In Proc. of SAC '02, LNCS 2595. Springer, pp. 62-75, 2002.
M. Blaze, G. Bleumer, M. Strauss. Divertible Protocols and Atomic Proxy Cryptography. Eurocrypt '98. LNCS 1403, pp. 127-144, 1998.
D. Boneh, S. Halevi, M. Hamburg, R. Ostrovsky. Circular-Secure Encryption from Decision Diffe-Hellman. In Proc. of Crypto '08, LNCS 5157, pp. 108-125, 2008.
R. Canetti, O. Goldreich, S. Halevi. The Random Oracle Methodology, Revisited. (Extended abstract in Proc. of the 30th ACM Symp. on Theory of Computing (STOC), pp. 209-218, 1998), 2002.
Y. Ishai, A. Paskin. Evaluating Branching Programs on Encrypted Data. In Proc. of TOC '07, 2007; whole document.
M. Naor, K. Nissim. Communication Preserving Protocols for Secure Function Evaluation. In Proc. of STOC '01, pp. 590-599, 2001.
R. Ostrovsky, W.E. Skeith III. Private Searching on Streaming Data. (Preliminary Version In Proc. of Crypto '05. LNCS 3621, pp. 223-240, 2005.) J. Cryptology, vol. 20:4, pp. 397-430, Nov. 2006, Oct. 2007 (two versions provided).
R.L. Rivest, L. Adelman, M.L. Dertouzos. On Data Banks and Privacy Homomorphisms. In Foundations of Secure Computation, pp. 169-180, 1978.
R.L. Rivest, A. Shamir, L. Adelman. A Method for Obtaining Digital Signatures and Public-Key Cryptosystems. In Comm. of the ACM, 21.2, pp. 120-126, 1978.

IBM Researcher Solves Longstanding Cryptographic Challenge. IBM Press Release (available online), Jun. 25, 2009; whole document.
Homomorphic Encryption. IBM Research, Security (available online), Accessed Sep. 28, 2009; whole document.
Homomorphic encryption. Wikipedia, accessed Sep. 30, 2009; whole document.
U.S. Appl. No. 12/590,584. Gentry, "A Fully Homomorphic Encryption Method Based on A Bootstrappable Encryption Scheme, Computer Program and Apparatus." filed Nov. 10, 2009; whole document.
Feller, W.; "An Introduction to Probability Theory and Its Applications", vol. 1, 3rd Edition; 1968; whole document (525 pages); John Wiley & Sons, Inc.
Gentry, C.; "Computing arbitrary function of encrypted data"; Communications of the ACM, vol. 53, No. 3; Mar. 2010; pp. 97-105.
Catalano, D. et al.; "Privacy aware processing of encrypted signals for treating sensitive information— List and definition of relevant primitives"; Priv-Ware, Aug. 2009; whole document (61 pages).
Gama, Nicolas, et al., "Predicting Lattice Reduction", In Advances in Cryptology—EUROCRYPT '08, vol. 4965 of Lecture Notes in Computer Science, pp. 31-51, 2008.
Gentry, Craig, "Toward Basing Fully Homomorphic Encryption on Worst-Case Hardness", In Advances In Cryptology—CRYPTO '10, vol. 6223 of Lecture Notes in Computer Science, 22 pgs., 2010.
Goldreich, Oded, et al., "Public-Key Cryptosystems from Lattice Reduction Problems", In Advances in Cryptology—CRYPTO '97, vol. 1294 of Lecture notes in Computer Science, pp. 112-131, 1997.
Lyubashevsky, Vadim, et al., On Ideal Lattices and Learning with Errors Over Rings. In Advances in Cryptology—EUROCRYPT '10, vol. 6110 of Lecture Notes in Computer Science, pp. 1-23, 2010.
Micciancio, Daniels, "Improving Lattice Based Cryptosystems Using the Hermite Normal Form", In CaLC '01, vol. 2146 of Lecture Notes in Computer Science, pp. 126-145, 2001.
Peikert, Christ et al., "Lattices that Admit Logarithmic Worst-Case to Average-Case Connection Factors", In Proceedings of the 39th Annual ACM Symposium on Theory of Computing STOC'07, pp. 478-487, Apr. 4, 2007.
Schnorr, C.P., "A Hierarchy of Polynomial Time Lattice Basis Reduction Algorithms", Theor. Comput. Sci., 53.201, pp. 201-224, 1987.
Schoup, NTL: A Library for doing Number Theory, http://shoup.net/ntl/; Version 5.5.2, Nov. 2010; whole document.
Smart, Nigel P., et al., "Fully Homomorphic Encryption with Relatively Small Key and Ciphertext Sizes", In Public Key Crypotography-PKC'10, vol. 6056 of Lecture Notes in Computer Science, pp. 420-443, 2010.
Stehle, Damien, et al., "Faster Fully Homomorphic Encryption", Cryptology ePrint Archive, Report 2010/399, http://eprint.iacr.org/; 25 pgs. 2010.
Applebaum, Benny, et al., "Fast Cryptographic Primitives and Circular-Secure Encryption Based on Hard Learning Problems", CRYTPO, vol. 5677 of Lecture Notes in Computer Science, pp. 595-618, 2009.
Brakerski, Zvika,et al., Efficient Fully Homomorphic Encryption from (Standard) LWE, FOCS, http://eprint.iacr.org/; 37 pgs.; 2011.
Brakerski, Zvika, et al., "Fully Homomorphic Encryption from Ring-LWE and Security for Key Dependent Messages", CRYPTO, 2011, 20 pgs.
Caron, Jean-Sebastien, et al., "Fully Homomorphic Encryption over the Integers with Shorter Public Keys", CRYPTO, 2011, 24 pgs.
Gentry, Craig et al., "Fully Homomorphic Enryption without Squashing Using Depth-3 Arithmetic Circuits", FOCS, http://eprint.iacr.org/; 2011, 21 pgs.
Gentry, Craig, et al., "Implementing Gentry's Fully-Homomorphic Encryption Scheme", EUROCRYPT, vol. 0632, Lecture notes in Computer Science, 2011, pp. 129-148.
Gentry, Craig, et al., "Fully Homomorphic Encryption with Polylog Overhead", http://eprint.iacr.org/; 2011, 32 pgs.
Lauter, Kristin, et al., "Can Homomorphic Encryption be Practical?", ACM, 2011, 11 pgs.
Melchor, Carlos Aguilar, et al., "Additively Homomorphic Enryption with d-Operand Multiplications", CRYPTOm vik, 6223, Lecture Notes in Computer Science, 2010, pp. 138-154.

(56) References Cited

OTHER PUBLICATIONS

Regev, Oded, "The Learning with Errors Problem", IEEE, 2010, pp. 191-204.
Smart N.P. et al., "Fully Homomorphic SIMD Operations", http://eprint.iacr.org/; 2011, 19 pgs.
Stehle, Damien, et al., "Faster Fully Homomorphic Encryption", ASIACRYPT, vol. 6477, Lecture Notes in Computer Science, 2010, pp. 377-394.
Chunsheng, Gu, "New fully Homomorphic Encryption over the Integers", School of Computer Engineering, Jiangsu Teachers Univ. of Technology, Mar. 2011, 9 pgs.
Dodis, Yevgeniy, et al., "Cryptography Against Continuous Memory Attacks", IEEE 2010, pp. 511-520.
Avanzi, Roberto M., "Fast Evaluation of Polynomials With Small Coefficients Modulo an Integer", http://caccioppoli.mac.rub.de/website/papers/trick.pdf; 2005, 5 pgs.
Gentry, Craig, et al., "Public Challenges for Fully-Homomorphic Encryption", TBA, 2010, 2 pgs.
Micciancio, Daniele, "Generalized Compact Knapsacks, Cyclic Lattices, and Efficient One-Way Functions", Computational Complexity 16(4), Dec. 2007, pp. 365-411.
Paterson, Michael S., et al., "On the Number of Nonscalar Multiplications Necessary to Evaluate Polynomials", SIAM Journal on Computing, 2(1), pp. 60-66, 1973.
Granlund, Torbjorn, et al., "The GNU MP Multiple Precision Arithmetic Library", Version 5.0.1, Feb. 2010, 144 pgs.
Dijk et al., http://csis.bits-pilani.ac.in/faculty/murali/netsec-11/seminadrefs/jaldeepl.pdf;, [online] published Jun. 2010 [retrieved on Jul. 5, 2012] Retrieved from the Internet URL: http://csis.bits-pilani.acin/faculty/murali/netsec-11/seminar/refs/jaldeepl.pdf; whole document.
C.A. Melchor, G. Castagnos, and P. Gaborit. Lattice-based homomorphic encryption of vector spaces. In IEEE International Symposium on Information Theory, ISIT'2008, pp. 1858-1862, 2008.
C.A. Melchor, P. Gaborit, and J. Herranz. Additively Homomorphic Encryption with t-Operand Multiplications. Technical Report 2008/378, IACR ePrint archive, 2008; whole document. Available at http://eprint.iacr.org/2008/378/.
M. Ajtai. Generating Hard Instances of the Short Basis Problem. ICALP'99, LNCS 1644, pp. 1-9, 1999.
J. Alwen and C. Peikert. Generating Shorter Bases for Hard Random Lattices. In STACS, pp. 75-86, 2009.
D. Boneh, E.-J. Goh, and K. Nissim. Evaluating 2-DNF Formulas on Ciphertexts. (TCC '05, LNCS 3378, pp. 325-341, 2005), 2006.
Y. Dodis, S. Goldwasser, Y. Kalai, C. Peikert, and V. Vaikuntanathan. Public-Key Encryption Schemes with Auxiliary Inputs. In TCC, pp. 361-381, 2010.
C. Gentry. A Fully Homomorphic Encryption Scheme. Dissertation, Stanford University, 2009; whole document. Available at http://crypto.stanford.edu/craig.
C. Gentry. Fully Homomorphic Encryption Using Ideal Lattices. In Proc. of STOC '09, pp. 169-178. ACM, 2009.
C. Gentry, C. Peikert, and V. Vaikuntanathan. Trapdoors for Hard Lattices and New Cryptographic Constructions. (In STOC, pp. 197-206, 2008), 2007.
A. Kawachi, K. Tanaka, and K. Xagawa. Multi-bit Cryptosystems Based on Lattice Problems. In Public Key Cryptography (PKC'07), LNCS 4450, pp. 315-329. Springer, 2007.
Y. Lindell and B. Pinkas. A Proof of Yao's Protocol for Secure Two-Party Computation. (J. Cryptology, 22(2), 2009), 2004; whole document.
C. Peikert. Public-Key Cryptosystems from the Worst-Case Shortest Vector Problem. In STOC'09, pp. 333-342. ACM, 2009.
O. Regev. On Lattices, Learning with Errors, Random Linear Codes, and Cryptography. J. ACM, 56(6), 2009. Preliminary version in Proc. of STOC '05, pp. 84-93, 2005.
T. Sander, A. Young, and M. Yung. Non-Interactive CryptoComputing for NC1. In 40th Annual Symposium on Foundations of Computer Science, pp. 554-567. IEEE, 1999.
A. C. Yao. Protocols for Secure Computations (extended abstract). In 23rd Annual Symposium on Foundations of Computer Science—FOCS '82, pp. 160-164. IEEE, 1982.
J. Domingo-Ferrer. "A Provably Secure Additive and Multiplicative Privacy Homomorphism." Information Security. 5th International Conference, ISC 2002 Proceedings, pp. 471-483, 2002.
K. Henry. The Theory and Applications of Homomorphic Cryptography. Dissertation, University of Waterloo, 2008; whole document.

\* cited by examiner

EFFICIENT HOMOMORPHIC ENCRYPTION SCHEME FOR BILINEAR FORMS

CROSS-REFERENCE TO RELATED APPLICATIONS

This is a continuation of U.S. patent Ser. No. 12/749,944, filed on Mar. 30, 2010, now U.S. Pat. No. 8,861,716, issued on Oct. 14, 2014, the disclosure of which is incorporated herein by reference in its entirety.

TECHNICAL FIELD

The exemplary embodiments of this invention relate generally to encryption and decryption algorithms and, more specifically, relate to homomorphic encryption schemes for bilinear forms.

BACKGROUND

Encryption schemes that support operations on encrypted data (e.g., homomorphic encryption) are very useful for secure computation.

A homomorphic encryption scheme is one wherein one or more operations (e.g., addition, multiplication) performed on two or more ciphertexts translate to the decrypted plaintexts (i.e., the decryption of the ciphertexts). For example, an encryption scheme may be said to be additively homomorphic if the decryption of the sum of the ciphertexts ($C_1+C_2$) yields the sum of the corresponding plaintexts ($B_1+B_2$) (possibly modulo a value): $dec(C_1+C_2) \rightarrow B_1+B_2$. Many public-key cryptosystems support either addition of multiplication of encrypted data, but obtaining both at the same time appears to be more difficult.

It is known that computing arbitrary functions on encrypted data can be implemented, e.g., using Yao's "garbled circuit" technique [16, 12], but the size of the ciphertext and complexity of decryption grow at least linearly with the number of gates in the circuit being computed. Also, Sander et al. [15] described a technique that permits evaluation of arbitrary circuits, but the ciphertext size grows exponentially with the circuit depth. Both of these methods can be implemented using only "general hardness assumptions" (e.g., the existence of two-flow Oblivious-Transfer protocols etc.).

Boneh, Goh, and Nissim described a cryptosystem that permitted arbitrary number of additions and one multiplication, without growing the ciphertext size [5]. This scheme is referred to herein as the BGN cryptosystem. Security of the BGN cryptosystem is based on the subgroup-membership problem in composite-order groups that admit bilinear maps. This cryptosystem immediately implies an efficient protocol for evaluating 2-disjunctive normal form (2DNF) formula (or more generally bilinear forms). Boneh et al. also described applications of the BGN cryptosystem to improving the efficiency of private information retrieval schemes (PIR) and for a voting protocol.

More recently, Aguilar Melchor, Gaborit, and Herranz described in [2] a "template" for converting some additively homomorphic encryption into a cryptosystem that permits both additions and multiplications. They show how to use this template to combine the BGN cryptosystem with the cryptosystem of Kawachi et al. [11], thus obtaining a cryptosystem that supports two multiplications and arbitrary additions, based on the hardness of both the subgroup membership problem and the unique-shortest vector problem in lattices. They also show how to use this template with the cryptosystem of Aguilar Melchor et al. [1] in order to obtain unlimited multiplication depth, where the ciphertext size grows exponentially with the multiplication depth but additions are supported without increasing the size. (Security of this last realization is based on a relatively unstudied hardness assumption, called the "Differential Knapsack Vector Problem.")

It is known that one can construct additively homomorphic encryption schemes from lattices or linear codes. Ciphertexts implicitly contain an "error" that grows as ciphertexts are operated on together (e.g., added, multiplied). Thus, the resulting ciphertexts do not have the same distribution as the original ciphertexts (e.g., as decrypted individually), and at some point the error may become large enough to cause incorrect decryption. For this reason, in such cases the homomorphism is sometimes referred to as a "pseudohomomorphism" or a "bounded homomorphism."

Very recently, Gentry described a fully homomorphic cryptosystem [9], supporting polynomially many additions and multiplications without increasing the ciphertext size, with security based on the hardness of finding short vectors in ideal lattices [8].

BRIEF SUMMARY

In one exemplary embodiment of the invention, a computer readable storage medium tangibly embodying a program of instructions executable by a machine for performing operations, the operations comprising: receiving information B to be encrypted as a ciphertext C in accordance with an encryption scheme that comprises an encrypt function; and encrypting the information B in accordance with the encrypt function of the encryption scheme to obtain the ciphertext C, where the encryption scheme utilizes at least one public key A corresponding to at least one private key T, where the information B, the ciphertext C, the at least one public key A and the at least one private key T are matrices, where the encrypt function receives as inputs the at least one public key A and the information B and outputs the ciphertext C as $C \leftarrow AS+pX+B(\bmod q)$, where S is a random matrix, where X is an error matrix, where p is in integer, where q is an odd prime number.

In another exemplary embodiment of the invention, an apparatus comprising: at least one storage medium configured to store information B to be encrypted as a ciphertext C in accordance with an encryption scheme that comprises an encrypt function; and at least one processor configured to encrypt the information B in accordance with the encrypt function of the encryption scheme to obtain the ciphertext C, where the encryption scheme utilizes at least one public key A corresponding to at least one private key T, where the information B, the ciphertext C, the at least one public key A and the at least one private key T are matrices, where the encrypt function receives as inputs the at least one public key A and the information B and outputs the ciphertext C as $C \rightarrow AS+pX+B(\bmod q)$, where S is a random matrix, where X is an error matrix, where p is in integer, where q is an odd prime number.

In a further exemplary embodiment of the invention, a computer readable storage medium tangibly embodying a program of instructions executable by a machine for performing operations, the operations comprising: receiving a ciphertext C to be decrypted as information B in accordance with an encryption scheme that comprises a decrypt function; and decrypting the ciphertext C in accordance with the decrypt function of the encryption scheme to obtain the information B, where the encryption scheme utilizes at least one private key T, where the information B, the ciphertext C, and the at least one private key T are matrices, where the decrypt function receives as inputs the at least one private key T and the ciphertext C and outputs the information B in accordance with $B=T^{-1} \cdot (TCT^t \bmod q) \cdot (T^t)^{-1} \bmod p$, where p is in integer, where q is an odd prime number.

In another exemplary embodiment of the invention, an apparatus comprising: at least one storage medium configured to store a ciphertext C to be decrypted as information B in accordance with an encryption scheme that comprises a decrypt function; and at least one processor configured to decrypt the ciphertext C in accordance with the decrypt function of the encryption scheme to obtain the information B, where the encryption scheme utilizes at least one private key T, where the information B, the ciphertext C, and the at least one private key T are matrices, where the decrypt function receives as inputs the at least one private key T and the ciphertext C and outputs the information B in accordance with $B=T^{-1} \cdot (TCT^t \bmod q) \cdot (T^t)^{-1} \bmod p$, where p is in integer, where q is an odd prime number.

In a further exemplary embodiment of the invention, a computer readable storage medium tangibly embodying a program of instructions executable by a machine for performing operations, the operations comprising: receiving information B to be encrypted as a ciphertext C in accordance with an encryption scheme that comprises an encrypt function and a decrypt function; and encrypting the information B in accordance with the encrypt function of the encryption scheme to obtain the ciphertext C, where the encryption scheme utilizes at least one public key A and at least one private key T corresponding to the at least one public key A, where the information B, the ciphertext C, the at least one public key A and the at least one private key T are matrices, where $B \in \mathbb{Z}_p^{m+m}$, $C \in \mathbb{Z}_q^{m \times m}$, $A \in \mathbb{Z}_q^{m \times n}$ and $T \in \mathbb{Z}_q^{m \times m}$, where n denotes a security parameter and m, q=poly(n), where q is an odd prime number, where p is in integer, where q>p, where the encrypt function receives as inputs A and B and outputs the ciphertext C as $C \leftarrow AS+pX+B(\bmod q)$, where S is a random matrix and $$S \xleftarrow{\$} \mathbb{Z}_q^{n \times m},$$

where X is an error matrix and $$X \xleftarrow{\$} \overline{\Psi}_\beta(q)^{m \times m},$$

where $\overline{\Psi}_\beta$ is an error distribution, where β is a Gaussian error parameter given by β=1/poly(n), where the decrypt function receives as inputs T and C and outputs the information B in accordance with $B=T^{-1} \cdot (TCT^t \bmod q) \cdot (T^t)^{-1} \bmod p$, where the encryption scheme is homomorphic and supports computing bilinear forms.

BRIEF DESCRIPTION OF THE SEVERAL VIEWS OF THE DRAWINGS

The foregoing and other aspects of embodiments of this invention are made more evident in the following Detailed Description, when read in conjunction with the attached Drawing Figures, wherein.

DETAILED DESCRIPTION

1 Brief Synopsis

Figure 1A:
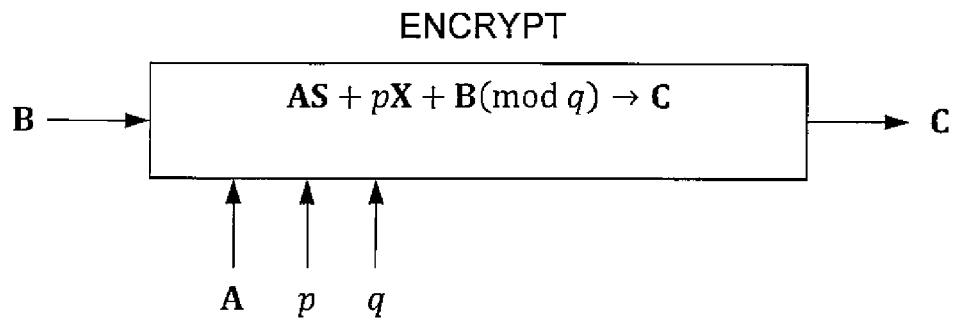
FIG. 1A shows an exemplary encrypt operation/function in accordance with the exemplary embodiments of the invention.

Exemplary embodiments of the invention construct a simple public-key encryption scheme that supports computing bilinear forms (e.g., polynomially many additions and one multiplication), similar to the cryptosystem of Boneh, Goh, and Nissim (BGN). Security is based on the hardness of the learning with errors (LWE) problem, which is known to be as hard as certain worst-case lattice problems.

Some features of the exemplary crypto system include support for large message space, an easy way of achieving formula-privacy, a better message-to-ciphertext expansion ratio than BGN, and an easy way of multiplying two encrypted polynomials. Also, the scheme can be made identity-based and leakage-resilient (at the cost of a higher message-to-ciphertext expansion ratio).

Any and all references herein to "Z" (e.g., $\mathbb{Z}_p^{m \times n}$ $\mathbb{Z}_p^{m \times n}$) should be understood to correspond to the set of all integers. Furthermore, any and all references herein to a secret, secret key or trapdoor should be understood to correspond to a private key (e.g., as in a public key-private key encryption scheme), and vice-versa.

The terminology used herein is for the purpose of describing various exemplary embodiments of the invention and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

1.1 Introduction

In this work an exemplary encryption scheme is described which is additively homomorphic, and, in addition, also supports one multiplication. The exemplary scheme is based on the trapdoor function proposed by Gentry, Peikert and Vaikuntanathan [10] (henceforth referred to as the GPV trapdoor function). In the GPV trapdoor function the "public key" is a matrix $A \in Z_p^{m \times n}$ (for parameters q>p and m>n, and the corresponding trapdoor is a full rank integer matrix with small entries $T \in Z^{m \times m}$ such that TA=0(mod q). The public and secret keys in the exemplary crypto system are exactly the same as in the GPV trapdoor function. A square matrix $B \in Z_p^{m \times m}$ is encrypted by setting $$C = AS + pX + B \mod q$$

where S is a random "coefficient matrix" $S \in Z_q^{n \times m}$ and X is a "noise matrix" with entries $X \in Z^{m \times m}$ such that the entries of X are much smaller than q. Ciphertext matrices can be added, and a single matrix multiplication $C' = C_1 \cdot C_2^t \mod q$ is also supported. ($C^t$ is the transpose of C.) To decrypt, one sets $$B = T^{-1} \cdot (TCT^t \mod q) \cdot (T^t)^{-1} \mod p$$

The security of the exemplary scheme is equivalent to the hardness of learning with errors (LWE). This problem, which is related to the well-known "learning parity with noise", has become standard in the study of lattice-based cryptography. The problem was first proposed by Regev [14], and shown by Regev [14] and Peikert [13] to be as hard as worst-case instances of various problems in integer lattices. It is briefly noted that the LWE problem is in relation to an associated error distribution.

1.2 Contributions

Perhaps the main difference between the exemplary scheme and previous work is the underlying hardness assumption. In particular, the exemplary scheme is the first reported cryptosystem based on LWE that has more than just additive homomorphism. Also, the exemplary scheme is very efficient: it can encrypt a matrix of $m^2$ elements in time $\tilde{O}(m^3)$, and decryption takes comparable time.

One important difference between the exemplary scheme and the BGN crypto system is that the BGN cryptosystem can only encrypt messages from a small space (since on decryption one only recovers a group element $g^m$, and then one needs to search for the message m). In the exemplary scheme, one can encrypt matrices over $Z_p$ for any p, as long as q is sufficiently larger than p. A related advantage is that by choosing a large modulus p, the exemplary scheme can be made to have ciphertext expansion of O(1) (whereas the BGN cryptosystem expands O(log n) bits of plaintext to O(n) ciphertext bits.)

It is noted that the modulus p that defines the message space in the exemplary scheme can be chosen dynamically by the encryptor: the same public/secret key pair can be used to encrypt/decrypt messages modulo many different fields (or rings). The exemplary scheme also supports ciphertext blinding (i.e., a given ciphertext is converted into a random ciphertext that encrypts the same thing), and also the stronger property of modular blinding: Given a ciphertext that encrypts a matrix $B \in Z_p^{m \times n}$, and given some divisor p' of p, one can produce a random ciphertext that encrypts B mod p'. For example, if the original plaintext matrix had n-bit numbers (e.g., in $Z_{2^n}$), one can blind the ciphertext so as to erase all but the least-significant bits of the entries in B.

One consequence of the (standard) blinding property and the flexibility of choosing the message space is that the exemplary system provides a very simple procedure for formula-private secure computation. Namely, it is very easy to compute 2DNF formulas (or a general bilinear form) on ciphertexts, while at the same time hiding from the holder of the secret key everything about the formula itself (other than the result of applying it on the given inputs).

Lastly, the exemplary scheme inherits much of the flexibility that comes with LWE-based cryptosystems. In particular, it can be made identity-based using the construction of Gentry et al. [10], and it can be made leakage resilient using a recent result of Dodis et al. [6]. Both of these applications follow from the observation that the "dual Regev cryptosystem" from [10] can be described as a special case of the exemplary cryptosystem.

Applications.

Clearly, the exemplary scheme can be used as a drop-in replacement in the applications to voting and PIR that were discussed in the paper of Boneh et al. [5]. In addition, since the exemplary scheme encrypts matrices natively, it is a good match for applications that can benefit from batching, or when efficient linear algebra is important. Some examples of batching include applications that (e.g., need to) multiply polynomials (whose coefficients are to be encoded in the entries of the plaintext matrix) or large integers (whose bit representation is to be encoded in the entries of the plaintext matrix). In Section 5.3 it is described how these can be encoded in a matrix so that a single multiplication of m×m matrices can be used to multiply two degree-(m-1) polynomials (or two m-bit integers), so that the result does not leak anything about the inputs other than their product.

1.3 Overview of the Exemplary Scheme

Below are sketched the main ideas behind the construction of the exemplary scheme. The exemplary scheme is based on the hardness of the decision LWE problem, which states that for a security parameter n and polynomially large m, given a uniformly random matrix $A \in Z_q^{m \times n}$, the vector As+x is pseudorandom (for uniform $s \in Z_q^n$ and "small error vector" $x \in Z_q^m$). The hardness of decision LWE is by now a standard assumption in the study of lattice-based cryptosystems, this problem was shown by Regev [14] and Peikert [13] to be as hard as solving a number of standard lattice problems in the worst-case.

The public key of the exemplary scheme is the random matrix $A \in Z_q^{m \times n}$, and the secret key is a "trapdoor matrix" T with small entries, satisfying T·A=0(mod q). The message space for the encryption scheme is the ring of m-by-m matrices of integers mod p (with the operations of matrix addition and multiplication). The scheme can work over any ring $Z_p$, as long as p is sufficiently smaller than the LWE modulus q. See Section 3 for farther details.

To encrypt a matrix $B \in Z_p^{m \times m}$, the encryptor chooses a random matrix $S \in Z_p^{n \times m}$ and a "small error matrix" X from the LWE error distribution. The ciphertext C is then $$C = A \cdot S + p \cdot X + B$$

One might want to keep in mind that the ciphertext is of the form (low-rank-matrix)+(small-noise-divisible-by-p)+(message). Decrypting the ciphertext involves multiplying the ciphertext by the trapdoor matrix T on the left (which gets rid of the low-rank matrix), then multiplying by $T^{-1}$ mod p to eliminate the noise, $$B = T^{-1} \cdot (T \cdot C \mod q) \mod p.$$

This works because T, X, and B are all small, hence all the entries in T·(pX+B) are less than q, which means that (T·C mod q) equals T·(pX+B) over the integers (not just mod q), and therefore it is equal to T·B mod p.

It is easy to see that the sum of encryptions of several matrices will be decrypted to the sum of these matrices, as long as all the entries (e.g., in T·$\Sigma C_i$ mod q) remain small. To obtain an encryption of a multiplication of two matrices, set $$C = C_1 \cdot C_2^t = (AS_1 + pX_1 + B_1)(AS_2 + pX_2 + B_2)^t = A \cdot \underbrace{(S_1 C_2^t)}_{S} +$$

$$p \cdot \underbrace{(X_1(pX_2 + B_2) + B_1 X_2^t)}_{X} + \underbrace{B_1 B_2^t}_{B} + \underbrace{(pX_1 + B_1)S_2^t}_{S'} \cdot A^t \pmod{q}$$

This looks similar to an encryption of $B_1 B_2^t$ (and indeed the error matrix X is small), except for the additional cross term $S'A^t$. To decrypt this product ciphertext, first set $M = T \cdot C \cdot T^t$ mod q, thus eliminating both the terms AS and $S'A^t$, and then $B = T^{-1} \cdot M \cdot (T^t)^{-1}$ mod p.

It is now clear why this scheme (e.g., only) supports a single multiplication: beyond that there are cross terms of the form $S \cdot A \cdot S'$, which one can no longer eliminate with the trapdoor T.

2 Preliminaries

Notation.

Denote scalars by lower-case letters (a, b, . . . ), vectors by lower-case bold letters (a, b, . . . , ), and matrices by upper-case bold letters (A, B, . . . ). Denote the Euclidean norm of a vector v by $\|v\|$, and the largest entry in a vector or a matrix is denoted $\|v\|_\infty$ or $\|M\|_\infty$, respectively. Consider the operation (a mod q) as mapping the integer a into the interval (−q/2,+q/2].

2.1 Learning with Errors (LWE)

The LWE problem was introduced by Regev [14] as a generalization of "learning parity with noise". For positive integers n and q≥2, a vector $s \in Z_q^n$, and a probability distribution $\chi$ on $Z_q$, let $A_{s,\chi}$ be the distribution obtained by choosing a vector $a \in Z_q^n$ uniformly at random and a noise term $x \leftarrow \chi$, and outputting $(a, \langle a, s \rangle + x) \in Z_q^n \times Z_q$.

Definition 1 (LWE) For an integer q=q(n) and an error distribution $\chi = \chi(n)$ over $Z_q$, the learning with errors problem $LWE_{n,m,q,\chi}$ is defined as follows: Given m independent samples from $A_{s,\chi}$ (for some $s \in Z_q^n$), output s with noticeable probability.

The decision variant of the LIFE problem, denoted $distLWE_{n,m,q,\chi}$, is to distinguish (with non-negligible advantage) m samples chosen according to $A_{s,\chi}$ (for uniformly random $s \in Z_q^n$), from m samples chosen according to the uniform distribution over $Z_q^n \times Z_q$.

For cryptographic applications, of primary interest is the decision problem distLWE. Regev [14] showed that for a prime modulus q, distLWE can be reduced to worst-case LWE, with a loss of up to a q·poly(n) factor in the parameter m.

At times, one may find it convenient to describe the LWE problem $LWE_{n,m,q,\chi}$ using a compact matrix notation: given (A, As+x) where $A \leftarrow Z_q^{m \times n}$ is uniformly random, $s \leftarrow Z_q^n$ is the LWE secret, and $x \leftarrow \chi^m$, find s. Similar matrix notation is also used for the decision version distLWE.

Gaussian Error Distributions $\Psi_\beta$.

Of primary interest are the LWE and distLWE problems where the error distribution $\chi$ over $Z_q$ is derived from a Gaussian. For any $\beta > 0$, the density function of a Gaussian distribution over the reals is given by $D_\beta(x) = 1/\beta \cdot \exp(-\pi(x/\beta)^2)$. For an integer q≥2, define $\Psi_\beta(q)$ to be the distribution on $Z_q$ obtained by drawing $y \leftarrow D_\beta$ and outputting $\lfloor q \cdot y \rceil \pmod{q}$. Write $LWE_{n,m,q,\beta}$ as an abbreviation for $LWE_{n,m,q,\Psi_{\beta(q)}}$.

Here are some basic facts about Gaussians (tailored to the error distribution $\Psi_\beta$); see, e.g. [7]. (In what follows overwhelming probability means probability 1−δ for δ which is negligible in n.)

Fact 1 Let $\beta > 0$ and $q \in Z$, and let the vector x be chosen as $x \leftarrow \Psi_\beta(q)^n$. Also let $y \in Z^n$ be an arbitrary vector and let $g = \omega(\sqrt{\log n})$. Then with overwhelming probability $|\langle x, y \rangle| \leq \beta q \cdot g \cdot P_y P$.

Fact 2 Let $y \in R$ be arbitrary. The statistical distance between the distributions $\Psi_\beta$ and $\Psi_\beta + y$ is at most $|y|/(\beta q)$.

Evidence for the hardness of $LWE_{n,m,q,\beta}$ follows from results of Regev [14], who gave a quantum reduction from approximating certain problems on n-dimensional lattices in the worst case to within $\tilde{O}(n/\beta)$ factors to solving $LWE_{n,m,q,\beta}$ for any desired m=poly(n), when $\beta \cdot q \geq 2\sqrt{n}$. Recently, Peikert [13] also gave a related classical reduction for some other problems with similar parameters.

As utilized herein, the relative attribute "small" is drawn from $\Psi_\beta$. Generally, a "small" value or integer is of size up to q·β. Similarly, a "large" value or integer is one that is much larger than q·β.

2.2 Trapdoor Sampling

The basis of the exemplary encryption scheme is a trapdoor sampling algorithm first constructed by Ajtai [3], and later improved by Alwen and Peikert [4]. The trapdoor sampling procedure generates an (almost) uniformly random matrix $A \in Z_q^{m \times n}$, together with $T \in Z^{m \times m}$ such that: (a) $T \cdot A = 0 \pmod{q}$, (b) T is invertible, and (c) the entries of T are small (e.g., of size O(n log q)).

The trapdoor T can be used to solve the LWE problem relative to A, i.e., given y=As+x where x is any "sufficiently short" vector, it can be used to recover s. This is done as follows: compute $$Ty = T(As + x) = TAs + Tx = Tx \pmod{q}$$

where the last equality follows since the rows of T belong to lattice $\Lambda^\perp(A)$. Now, since both T and x contain small entries, each entry of the vector Tx is smaller than q, and thus Tx mod q is Tx itself. Finally, multiply by $T^{-1}$ (which is well-defined since T is a basis and therefore has full rank) gives x. The LWE secret s can then be recovered by Gaussian elimination. The result of Alwen and Peikert [4] is stated below.

Lemma 1 ([3, 4]) There is an efficient algorithm TrapSample that, on input $1^n$, a positive integer q≥2, and a poly (n)-bounded positive integer m≥8n log q, outputs matrices $A \in Z_q^{m \times n}$ and $T \in Z^{m \times m}$ such that:

A is statistically close to uniform over $Z_q^{m \times n}$, the rows of T form a basis of the lattice $\Lambda^\perp(A) \stackrel{def}{=} \{w \in Z^m : w \cdot A = 0 \pmod{q}\}$, the Euclidean norm of all the rows of T (and therefore also $|T|_\infty$) is bounded by O(n log q). (Alwen and Peikert [4] assert that the constant hidden in the O(•) is no more than 20.)

Note that since the rows of T span the lattice $\Lambda^\perp(A)$, it follows that $det(T) = q^n$, hence for any p co-prime with q one knows that T is invertible mod p.

3 The Exemplary Encryption Scheme

Let n denote the security parameter. Other parameters of the system are three numbers m, p, q=poly(n) (with q>p an odd prime), and a Gaussian error parameter $\beta = 1/poly(n)$. See Section 3.2 for concrete, exemplary instantiations of these parameters. For these parameters, the message space is the set of m-by-m matrices, i.e., $B \in Z_p^{m \times m}$. Public keys are matrices $A \in Z_q^{m \times n}$, secret key are matrices $T \in Z_q^{m \times n}$, and ciphertexts are matrices $C \in Z_q^{m \times m}$.

The exemplary encryption scheme includes (e.g., at least) the following three algorithms:

KeyGen(1$^n$): Run the trapdoor sampling algorithm Trap Sample of Lemma 1 to obtain a matrix $A \in Z_q^{m \times n}$ together with the trapdoor matrix $T \in Z^{m \times m}$, (A, T)←Trap Sample (n, q, m). The public key is A and the secret key is T.

Enc(A,$B \in Z_p^{m \times m}$): Choose a random matrix $$S \stackrel{\$}{\leftarrow} Z_q^{n \times m}$$

(e.g., a uniformly random matrix) and an "error matrix"

$$X \stackrel{\$}{\leftarrow} \Psi_\beta(q)^{m \times m}.$$

Output the ciphertext $$C \leftarrow AS + pX + B \pmod{q}$$

(Here, pX means multiplying each entry of the matrix X by p.)

Dec(T,C): Set $E \leftarrow TCT^t \bmod q$, and then output $B \leftarrow T^{-1}E (T^t)^{-1} \bmod p$.

To see that decryption works, recall that $T \cdot A = 0 \pmod q$ and therefore $TCT^t = T(pX+B)T^t \pmod q$. If in addition all the entries of $T(pX+B)T^t$ are smaller than q then one also has the equality over the integers $E = (TCT^t \bmod q) = T(pX+B)T^t$, and hence $T^{-1}E(T^t)^{-1} = B \pmod p$. This means that one has correct decryption as long as one sets the parameter β small enough so that with high probability all the entries of $T(pX+B)T^t$ are smaller than q/2.

Remark 1 Note that the right-multiplication by $T^t$ and $(T^t)^{-1}$ on decryption is redundant here—one can instead just compute $B \leftarrow T^{-1}$ (TC mod q) mod p. The right-multiplication is needed to decrypt product ciphertexts, as described below. As opposed to the BGN cryptosystem, in the exemplary scheme the "normal ciphertexts" and "product ciphertexts" live in the same space, and one can use the same decryption procedure to decrypt both.

Also, one can optimize away the need to multiply by $T^{-1}$ and $(T^t)^{-1}$ by using the modified trapdoor $T' = (T^{-1} \bmod p) \cdot T$ (product over the integers). Clearly one has $T'A = 0 \pmod q$, and the entries of T' are not much larger than those of T (since all entries in $(T^{-1} \bmod p)$ are at post p/2 in absolute value).

3.1 Homomorphic Operations

Addition.

Given two ciphertexts $C_1, C_2$ that decrypt to $B_1, B_2$, respectively, it is easy to see that the matrix $C = C_1 + C_2 \bmod q$ would decrypt to $B_1 + B_2 \bmod p$, as long as there is no "overflow" in any entry. Specifically, if one has $C_1 = AS_1 + pX_1 + B_1$ and $C_1 = AS_2 + pX_2 + B_2$ then $$C = C_1 + C_2 = A(S_1 + S_2) + p(X_1 + X_2) + (B_1 + B_2)$$

which would be decrypted as $B_1 + B_2$ as long as all the entries in $T(p(X_1+X_2)+B_1+B_2)T^t$ are smaller than q/2. See Section 3.2 for examples of the exact parameters.

Multiplication.

Given two ciphertexts $C_1, C_2$ that encrypt $B_1, B_2$, respectively, compute the product ciphertext as $C = C_1 \cdot C_2^t \bmod q$. If one has $C_1 = AS_1 + pX_1 + B_1$ and $C_2 = AS_2 + pX_1 + B_2$ then $$C = C_1 \cdot C_2^t = (AS_1 + pX_1 + B_1)(AS_2 + pX_2 + B_2)^t = A \cdot \underbrace{(S_1 C_2^t)}_{S} +$$
$$p \cdot \underbrace{(X_1(pX_2 + B_2) + B_1 X_2^t)}_{X} + \underbrace{B_1 B_2^t}_{B} + \underbrace{(pX_1 + B_1)S_2^t}_{S'} \cdot A^t \pmod q.$$

Hence the product ciphertext has the form $AS + pX + B + S'A^t$.

As before, one can see that $TCT^t = T(pX+B)T^t \pmod q$, and if all the entries of $T(pX+B)T^t$ are smaller than q/2 then one has $E = (TCT^t \bmod q) = T(pX+B)T^t$ over the integers, and therefore $T^{-1}E(T^t)^{-1} = B \pmod p$. Below exemplary parameters are discussed that allow for this to work.

3.2 Setting the Parameters

Theorem 2 Fix the security parameter n, parameter p and any c=c(n)>0. Let q, m, β be set as $$q > 2^{20} p^2 (c+4)^3 n^{3c+4} \log^5 n, q \text{ is a prime}$$

$$m = \lfloor 8n \log q \rfloor$$

$$\beta = \frac{1}{27 pn^{1+(3c/2)} \log n \log q \sqrt{qm}}$$

Then the exemplary encryption scheme from above with parameters p, n, m, q, β supports $n^c$ additions and one multiplication (in any order) over the matrix ring $Z_p^{m \times m}$.

Remark 3 Note that in Theorem 2 one can allow $n^c$ additions for a non-constant c. The reason that this may be needed is for taking linear combinations of ciphertexts with large coefficients. Specifically, if one has ciphertext matrices $C_1, C_2, \ldots$, one can homomorphically compute $\Sigma \alpha_i C_i$ as long as $|\Sigma \alpha_i| < n^c$.

4 Extensions and Applications 4.1 Dynamic Choice of the Underlying Ring

Note that once the parameters are fixed, the choice of the underlying ring for the plaintext can be made adaptively by the encryptor. Namely, with the same public key A and secret key T, the encryptor can choose the underlying ring as $Z_r$ for any r≤p (thereby computing the ciphertext as C=AS+rX+B), and the decryptor can decrypt accordingly.

4.2 Formula Privacy

As described so far, the scheme does not ensure "formula privacy" against the holder of the secret key. For example, given a ciphertext matrix C, the decryptor may be able to distinguish the case where this ciphertext was obtained by multiplying an encryption of the identity with an encryption of the zero matrix from the case where it was obtained by multiplying two encryptions of the zero matrix.

This deficiency can be remedied by standard techniques. First increase the size of the modulus somewhat: switching from q as specified in Theorem 2 to $q' \geq q \cdot 2^{\omega(\log n)}$. Then given a ciphertext matrix C* encrypting some plaintext matrix mod p, blind it by setting $$C \leftarrow C^* + AS_1 + pX^* + S_2^t A^t,$$

where S, S' are uniform in $Z_q^{n \times m}$ and each entry of X* is chosen from $\Psi_{\beta'}(q)$ with β' super-polynomially larger than the parameter β that is used in the scheme.

Using Fact 2 one can then show that the noise in the added X* "drowns out" all traces of the origin of this ciphertext. Namely, the resulting ciphertext is of the form $C = AS_1' + pK + B + (S_2')^t A^t$, where $S_1', S_2'$, are random (e.g., uniformly random), B is the corresponding plaintext, and the distribution of X' is nearly independent of the provenance of this ciphertext matrix.

Note that the same blinding technique can be used even if the encrypted plaintext matrix were chosen in a larger ring $Z_{p'}$, as long as the parameter p that is used in the blinding procedure divides the original p'.

4.3 Encrypting Polynomials and Large Integers

To encrypt polynomials or large numbers, encode them as matrices in a way that would let one exploit the matrix operations that are supported natively by the exemplary scheme to do operations over the these polynomials or numbers.

Begin with polynomials: it is well known how to embed the coefficients of two polynomials in two matrices, so that multiplying these matrices yields all the coefficients of the resulting product polynomial. For example, for two polynomials $\hat{a}(x)=\Sigma a_i x^i$ and $\hat{b}(x)=\Sigma b_i x^i$, one can use $$A = \begin{pmatrix} a_3 & a_2 & a_1 \\ & a_3 & a_2 \\ & & a_3 \end{pmatrix}$$

$$B = \begin{pmatrix} b_1 & b_2 & b_3 \\ & b_1 & b_2 \\ & & b_1 \end{pmatrix} \Rightarrow AB' = \begin{pmatrix} a_1 b_3 + a_2 b_2 + a_3 b_1 & a_1 b_2 + a_2 b_1 & a_1 b_1 \\ a_2 b_3 + a_3 b_2 & * & * \\ a_3 b_3 & * & * \end{pmatrix}$$

Note that the product matrix above is not private in that it reveals more than just the coefficients of the product polynomial. This can easily be fixed by adding an encryption of a matrix with zero first column and first row and random entries everywhere else. Also, this simple embedding is "wasteful" in that it results in ciphertext expansion ratio of O(m) (encrypt degree-(m−1) polynomials using m×m matrices). More economical embeddings may be possible.

Moving to integer multiplication, an obvious way of multiplying two m-bit integers is to just set the plaintext space to $Z_p$ for some $p \geq 2^{2m}$, but working with such large plaintext space may be inconvenient. Thus, it may be desirable to seek a method for implementing large integer multiplication with a small input space. One possibility is to use the same technique as was done for polynomials, viewing the integer with binary representation $a = \Sigma a_i 2^i$ as a binary polynomial $\hat{a}(x)$ evaluated at x=2. Given two integers a,b, encrypt the binary coefficients of the corresponding polynomials $\hat{a}$, $\hat{b}$ over plaintext space $Z_p$ for some $p \geq m$. Reading out the coefficients of the product polynomial, then compute $a \cdot b = (\hat{a} \cdot \hat{b})(2)$ over the integers.

However, this solution is not private since it leaks more information about a, b than just their integer product. One approach for making it private is to add random elements $r_i \in Z_p$ to the first row and column of the product matrix such that $\Sigma_i 2^i r_i = 0 \pmod p$. This will make it possible for the secret key holder to recover $a \cdot b \pmod p$. Repeating it several times with different p's, one can then use Chinese remaindering to recover $a \cdot b$ completely.

4.4 Two-Out-of-Two Decryption

Note that for the exemplary crypto system, if one has encryptions of two matrices under two different public keys, one can multiply these two ciphertexts, thus obtaining a "ciphertext" corresponding to the product of the two plaintext matrices. This "ciphertext" can then be decrypted by pulling together the two secret keys.

In more detail, suppose that one has two public keys $A_1$, $A_2$ and the corresponding two secret keys $T_1$, $T_2$, with both pairs defined modulo the same prime number q. (Also assume for simplicity that both pairs use the same parameters n and m, though this assumption may not be needed.) Then, given two ciphertexts $$C_1 = A_1 S_1 + pX_1 + B_1 \text{ and } C_2 = A_2 S_2 + pX_2 + B_2,$$

one can compute the "product ciphertext" $C = C_1 C_2^t \pmod q$, corresponding to the plaintext $B_1 B_2^t \pmod p$. This plaintext can be recovered if one knows both $T_1$ and $T_2$, by setting $$B \leftarrow (T_1^{-1} \cdot (T_1 C T_2^t \mod q) \cdot (T_2^t)^{-1}) \mod p$$

4.5 Identity-Based and Leakage-Resilient BGN-Type Encryption

Next is shown how to extend the one-multiplication homomorphism beyond just standard public-key encryption, to get more "advanced features" such as identity-based encryption and leakage-resilience, as non-limiting examples. This follows from the simple observations that the "dual Regev cryptosystem" from [10] (with a different input encoding) can be viewed as a special case of the exemplary encryption scheme (for a particular form of matrices), and hence it supports the same homomorphic operations. IBE (in the random-oracle model) follows directly since Gentry et al. showed in [10] how to derive dual Regev keys from a master key, and leakage-resilience follows since Dodis et al. proved in [6] that the dual Regev crypto system is leakage resilient.

Recall the "dual Regev cryptosystem" from [10]: The public key is a matrix $A \in Z_q^{m \times m}$, and the secret key is one short vector in the dual, namely a short $\vec{u} \in Z_q^m$ such that $\vec{u} A = 0 \pmod q$. Moreover, the last entry in $\vec{u}$ is always −1.

In the cryptosystem as described in [10], a bit b is encrypted by choosing a uniform vector $\vec{s} \in Z_q^n$ and a small error vector $\vec{x} \in Z_q^m$, and then encoding the bit b in the "most significant bit" of one entry of the ciphertext vector, namely $\vec{c} \leftarrow A\vec{s} + \vec{x} + \langle 0 \ldots 01 \rangle \cdot \lceil q/2 \rceil \mod q$. To get homomorphism, however, encode the input in the least significant bit, setting $\vec{c} \leftarrow A\vec{s} + 2\vec{x} + \langle 0 \ldots 0 b \rangle^t \mod q$. With this input encoding, one can view the dual Regev cryptosystem as a special case of the exemplary cryptosystem, where the public key is the same matrix A, and the secret key is not a full rank matrix but instead a rank-1 matrix. The matrices T, S, X, B are defined as $$T = \begin{pmatrix} -\vec{u}- \\ 0 \end{pmatrix}, S = (0\vec{s}), X = (0\vec{x}), B = \begin{pmatrix} 0 \\ & b \end{pmatrix}.$$

(That is, all but the top row of T are zero, all but the rightmost columns of S, X are zero, and all but the bottom-right element of B are zero.)

It is easy to show that semantic security follows from LWE. Since the key is just the dual Regev key, then the same proof as in [6] shows that it remains secure even in the face of partial leakage of the secret key. Also, it was shown in [10] how this secret key can be computed from a master secret key in an identity-based setting (in the random-oracle model). With these choices, most of the "ciphertext matrix" is zero, so all one needs to output as the ciphertext is indeed the one vector $\vec{c} \leftarrow A\vec{s} + 2\vec{x} + \langle 0 \ldots 0 b \rangle^t \mod q$, which implicitly encodes the matrix $C = (0\vec{c})$. The homomorphic operations are then applied to the implicit matrices, namely addition is just element-wise addition modulo q and multiplication of two vectors is an outer-product operation.

To decrypt a ciphertext matrix, multiply if from left and right by the secret key vector $\vec{c}$, reducing the result first modulo q and then modulo 2. Due to the special form of the plaintext matrix B, this is the same as multiplying by T on the left and $T^t$ on the right, and then taking only the bottom right element of the result.

Although the matrix T no longer has an inverse, one can still recover the hidden bit b. This is done simply by setting $b \leftarrow \vec{u} C \vec{u}^t$ mod q mod 2, without needing to multiply by the inverse, since one has $$(\vec{u} C \vec{u}^t \bmod q) = \vec{u} \begin{pmatrix} 0 & \\ & b \end{pmatrix} \vec{u}^t = b \cdot u_m^2 \pmod 2$$

Recalling that $u_m = -1$ in the dual Regev cryptosystem, this procedure indeed gives the right answer.

4.6 Simple Decryption

As described above, the ciphertext is decrypted in accordance with:

$$B = T^{-1} \cdot (TCT^t \bmod q) \cdot (T^t)^{-1} \bmod p$$

One extension of this is to use a "simple" decryption formula instead:

$$B = T^{-1} \cdot (TC \bmod q) \bmod p$$

The simple decryption should be accurate enough (e.g., good enough) for decryption as long as the ciphertext was not subject to multiplication.

5 Further Exemplary Embodiments

Figure 1B:
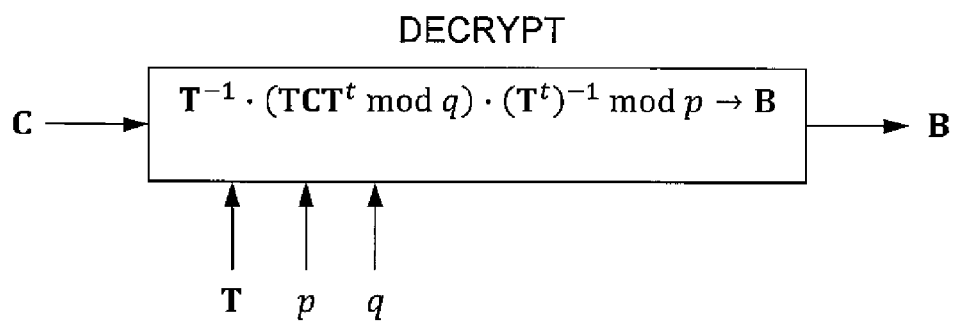
FIG. 1B shows an exemplary decrypt operation/function in accordance with the exemplary embodiments of the invention.
Figure 1C:
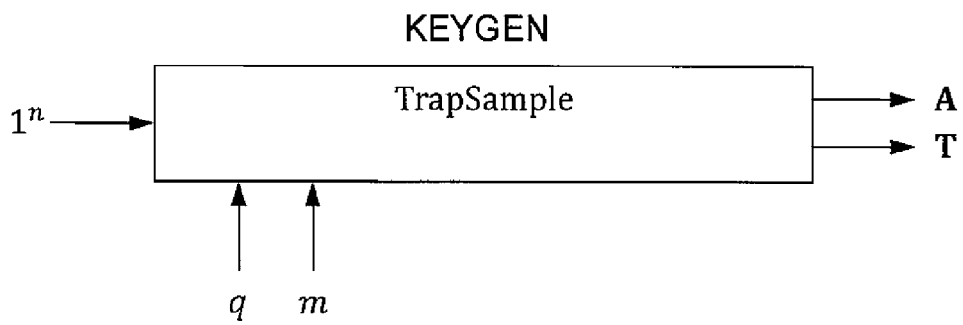
FIG. 1C shows an exemplary key generation (KeyGen) operation/function in accordance with the exemplary embodiments of the invention.
Figure 1D:
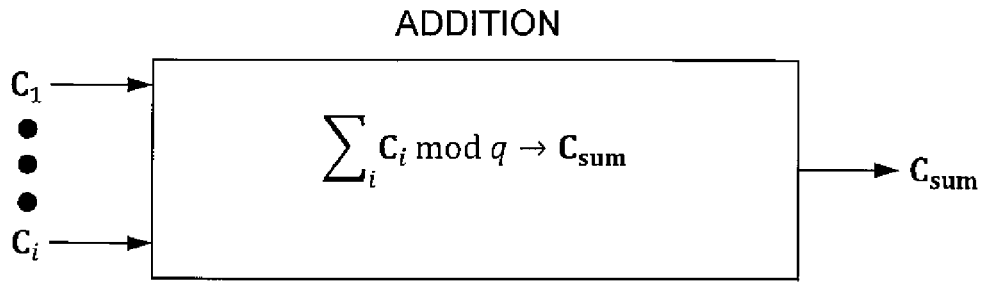
FIG. 1D shows an exemplary ciphertext addition operation/function in accordance with the exemplary embodiments of the invention.
Figure 1E:
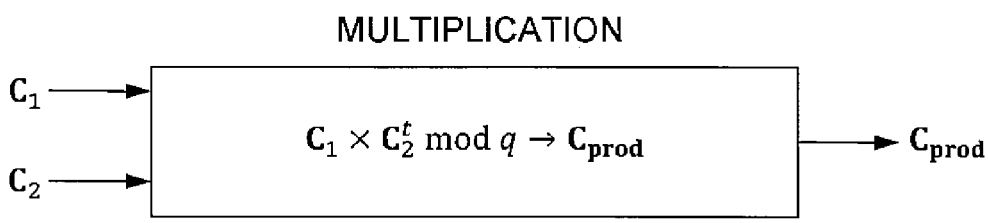
FIG. 1E shows an exemplary ciphertext multiplication operation/function in accordance with the exemplary embodiments of the invention.

FIG. 1A shows an exemplary encrypt operation/function in accordance with the exemplary embodiments of the invention. FIG. 1B shows an exemplary decrypt operation/function in accordance with the exemplary embodiments of the invention. FIG. 1C shows an exemplary key generation (KeyGen) operation/function in accordance with the exemplary embodiments of the invention. FIG. 1D shows an exemplary ciphertext addition operation/function (e.g., for i ciphertexts, for $n^c$ ciphertexts) in accordance with the exemplary embodiments of the invention. FIG. 1E shows an exemplary ciphertext multiplication operation/function (e.g., for two ciphertexts $C_1$ and $C_2$) in accordance with the exemplary embodiments of the invention.

Figure 1F:
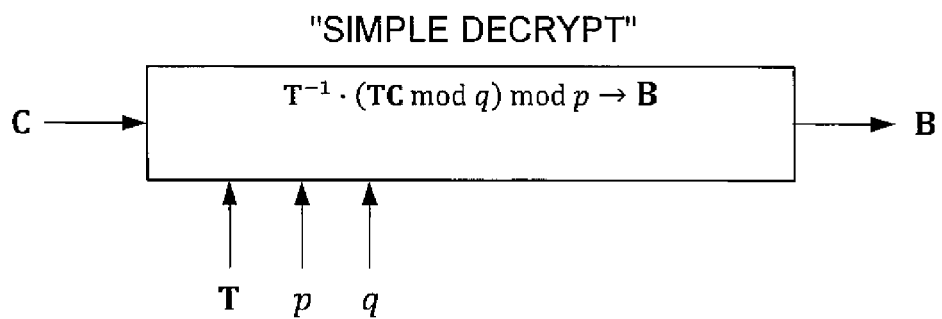
FIG. 1F shows an exemplary "simple decrypt" operation/function in accordance with the exemplary embodiments of the invention.

FIG. 1F shows an exemplary "simple decrypt" operation/function in accordance with the exemplary embodiments of the invention.

Figure 2:
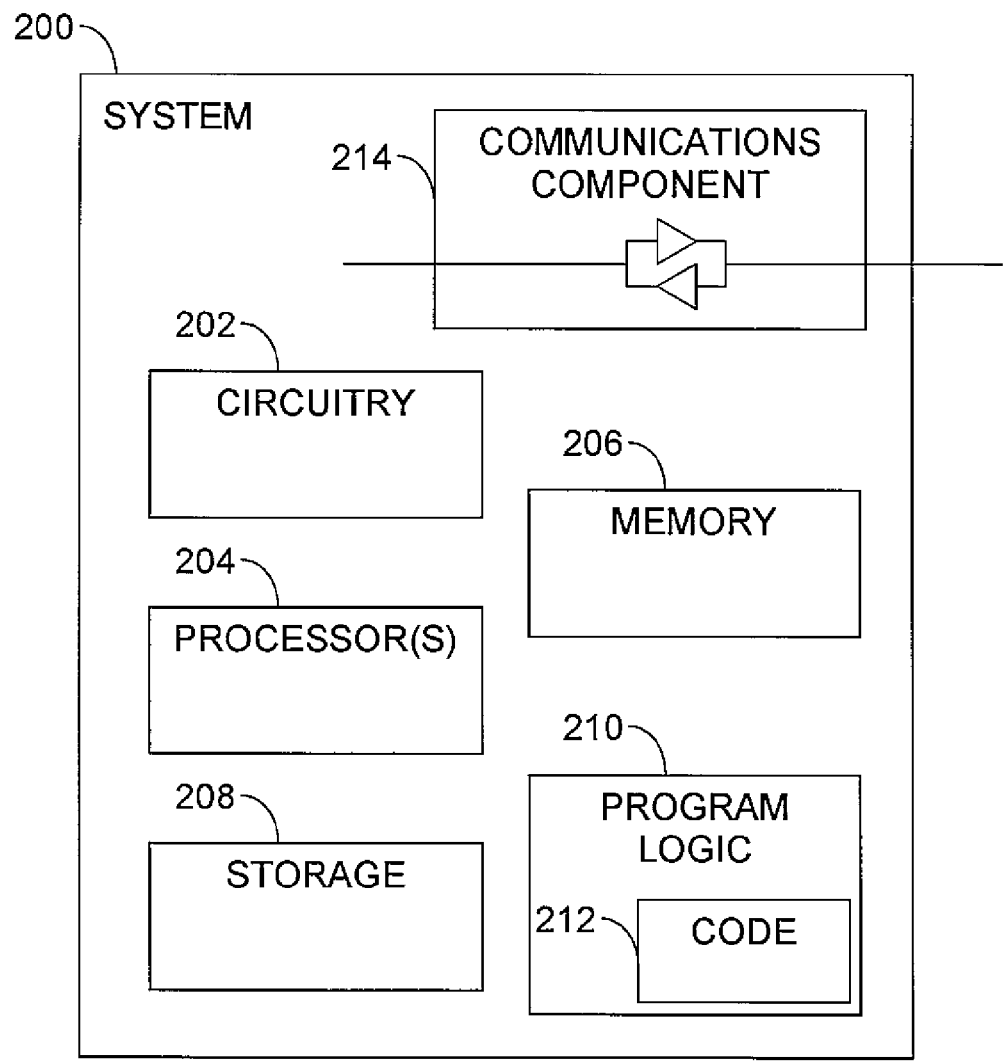
FIG. 2 illustrates a block diagram of a system in which various exemplary embodiments of the invention may be implemented.

FIG. 2 illustrates a block diagram of a system 200 in which certain exemplary embodiments may be implemented. In certain exemplary embodiments, the various blocks shown in FIG. 1 may be implemented, collectively or individually, in accordance with the system 200. The system 200 may include at least one circuitry 202 that may in certain embodiments include at least one processor 204. The system 200 may also include at least one memory 206 (e.g., a volatile memory device), and/or at least one storage 208. The storage 208 may include a non-volatile memory device (e.g., EEPROM, ROM, PROM, RAM, DRAM, SRAM, flash, firmware, programmable logic, etc.), magnetic disk drive, optical disk drive and/or tape drive, as non-limiting examples. The storage 208 may comprise an internal storage device, an attached storage device and/or a network accessible storage device, as non-limiting examples. The system 200 may include at least one program logic 210 including code 212 (e.g., program code) that may be loaded into the memory 206 and executed by the processor 204 and/or circuitry 202. In certain exemplary embodiments, the program logic 210, including code 212, may be stored in the storage 208. In certain other exemplary embodiments, the program logic 210 may be implemented in the circuitry 202. Therefore, while FIG. 2 shows the program logic 210 separately from the other elements, the program logic 210 may be implemented in the memory 206 and/or the circuitry 202.

The system 200 may include at least one communications component 214 that enables communication with at least one other system, device and/or apparatus. The communications component 214 may include a transceiver configured to send and receive information, a transmitter configured to send information and/or a receiver configured to receive information. As a non-limiting example, the communications component 214 may comprise a modem or network card. The system 200 of FIG. 2 may be embodied in a computer or computer system, such as a desktop computer, a portable computer or a server, as non-limiting examples. The components of the system 200 shown in FIG. 2 may be connected or coupled together using one or more internal buses, connections, wires and/or (printed) circuit boards, as non-limiting examples.

It should be noted that in accordance with the exemplary embodiments of the invention, one or more of the circuitry 202, processor(s) 204, memory 206, storage 208, program logic 210 and/or communications component 214 may store one or more of the various items (e.g., matrices, variables, equations, formula, operations, operational logic, logic) discussed herein. As a non-limiting example, one or more of the above-identified components may receive and/or store the information B (e.g., to be encrypted, resulting from decryption) and/or the ciphertext C (e.g., to be decrypted, resulting from encryption). As a further non-limiting example, one or more of the above-identified components may receive and/or store the encryption function and/or the decryption function, as described herein.

Below are further descriptions of various non-limiting, exemplary embodiments of the invention. The below-described exemplary embodiments are numbered separately for clarity purposes. This numbering should not be construed as entirely separating the various exemplary embodiments since aspects of one or more exemplary embodiments may be practiced in conjunction with one or more other aspects or exemplary embodiments.

Figure 3:
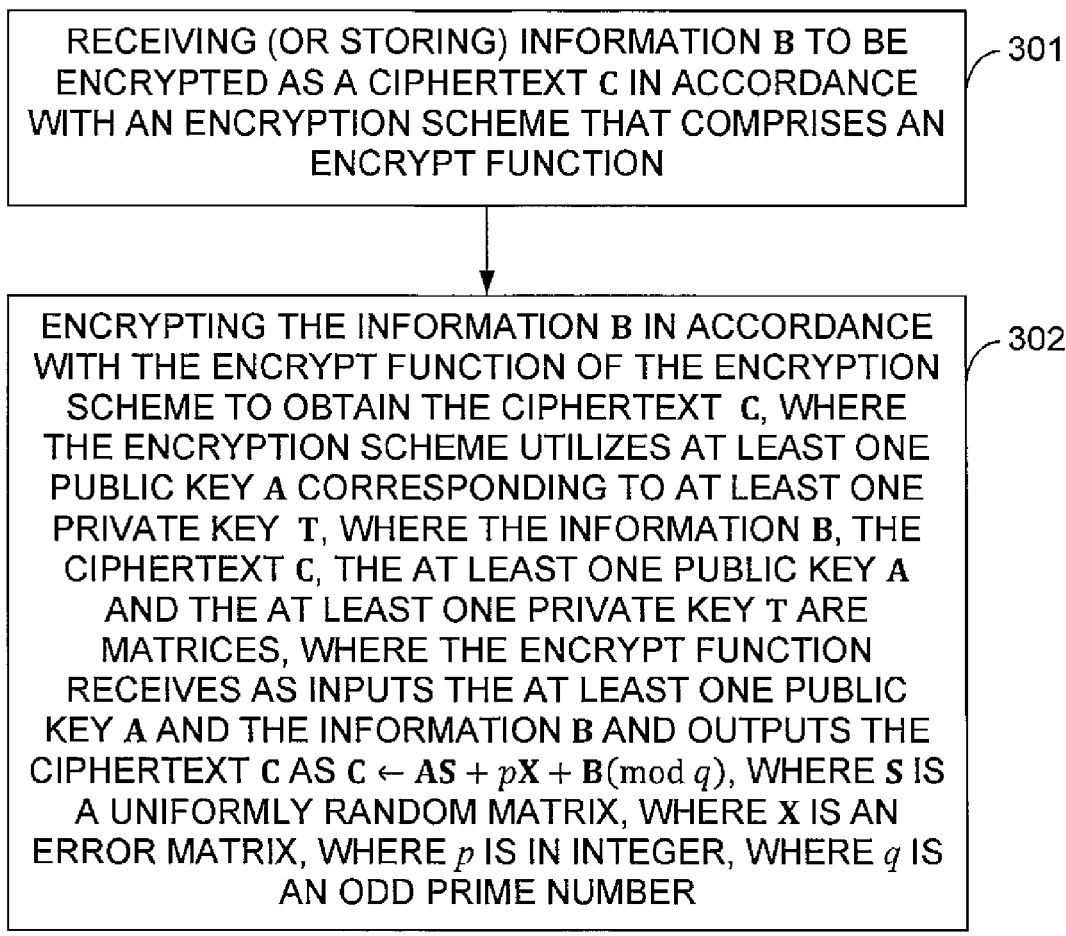
FIG. 3 depicts a logic flow diagram illustrative of the operation of an exemplary method, and the operation of an exemplary computer program, in accordance with the exemplary embodiments of this invention.

(1) In one exemplary embodiment, and as shown in FIG. 3, a computer readable storage medium tangibly embodying a program of instructions executable by a machine for performing operations, the operations comprising: receiving information B to be encrypted as a ciphertext C in accordance with an encryption scheme that comprises an encrypt function (301); and encrypting the information B in accordance with the encrypt function of the encryption scheme to obtain the ciphertext C (302), where the encryption scheme utilizes at least one public key A corresponding to at least one private key T, where the information B, the ciphertext C, the at least one public key A and the at least one private key T are matrices, where the encrypt function receives as inputs the at least one public key A and the information B and outputs the ciphertext C as $C \leftarrow AS + pX + B \pmod q$, where S is a random matrix, where X is an error matrix, where p is in integer, where q is an odd prime number.

A computer readable storage medium as above, where $B \in \mathbb{Z}_p^{m \times m}$, $C \in \mathbb{Z}_q^{m \times m}$, $A \in \mathbb{Z}_q^{m \times n}$, $$S \xleftarrow{\$} \mathbb{Z}_q^{n \times m}$$

and $$X \xleftarrow{\$} \Psi_\beta(q)^{m \times m},$$

where n denotes a security parameter and m, q=poly(n), where $\Psi_\beta$ is an error distribution, where β is a Gaussian error parameter given by β=1/poly(n). A computer readable storage medium as in any above, where the encryption scheme is homomorphic and supports computing bilinear forms (e.g., polynomially many additions and one multiplication). A computer readable storage medium as in any above, where p=2 and the information B comprises a matrix of binary values. A computer readable storage medium as in any above, where c–c(n)>0, q>$2^{20}p^2(c+4)^3$ $n^{3c+4}$ $\log^5 n$, $$m = \lfloor 8n\log q \rfloor \text{ and } \beta = \frac{1}{27pn^{1+(3c/2)}\log n \log q \sqrt{qm}}.$$

A computer readable storage medium as in any above, where the encryption scheme supports $n^c$ additions and one multiplication in any order over a matrix ring $\mathbb{Z}_p^{m \times m}$.

A computer readable storage medium as in any above, the operations further comprising: outputting the ciphertext C. A computer readable storage medium as in any above, where p is an order of a space that includes the information B. A computer readable storage medium as in any above, where p is an order of a space $\mathbb{Z}_p^{m \times m}$ and $B \in \mathbb{Z}_p^{m \times m}$. A computer readable storage medium as in any above, where the encryption scheme further enables formula-private secure computation such that a holder of the private key is configured to decrypt ciphertexts without obtaining further knowledge of a formula of the decryption function. A computer readable storage medium as in any above, where q>p. A computer readable storage medium as in any above, where the encryption scheme comprises a homomorphic encryption scheme for circuits of logarithmic multiplication depth with an arbitrary number of additions and where security of the homomorphic encryption scheme is based on hardness of a learning with errors problem. A computer readable storage medium as in any above, where (entries of) T, X and B are small such that entries in T·(2X–B) are less than q. A computer readable storage medium as in any above, where a size of the ciphertext C is approximately (e.g., substantially) three times a size of the plaintext B.

A computer readable storage medium as in any above, where the encryption scheme further comprises a key generation function, where the key generation function receives as inputs $1^n$, q and in and outputs the at least one public key A and the at least one private key T. A computer readable storage medium as in any above, where the key generation function operates by running a trapdoor sampling algorithm that, on input $1^n$, a positive integer q≥2 and a poly(n)-bounded positive integer m≥8n log q, outputs matrices $A \in \mathbb{Z}_q^{m \times n}$ and $T \in \mathbb{Z}_q^{m \times m}$. A computer readable storage medium as in any above, where A is statistically close to uniform over $\mathbb{Z}_q^{m \times n}$, the rows of T form a basis of a lattice $$\Lambda^\perp(A) \stackrel{def}{=} \{w \in \mathbb{Z} : w \cdot A = 0 (\bmod q)\}$$

and a Euclidean norm of the rows of T is bounded by O(n log q). A computer readable storage medium as in any above, where T·Λ=0(mod q), T is invertible and the entries of T are small.

A computer readable storage medium as in any above, where the encryption scheme further comprises a decrypt function, where the decrypt function receives as inputs the at least one private key T and the ciphertext C and outputs the information B in accordance with B=$T^{-1}$·(TCT$^t$ mod q)·$(T^t)^{-1}$ mod p. A computer readable storage medium as in any above, where $T \in \mathbb{Z}_q^{m \times m}$.

A computer readable storage medium as in any above, further comprising one or more additional aspects of the exemplary embodiments of the invention as described herein.

(2) In another exemplary embodiment of the invention, an apparatus comprising: at least one storage medium configured to store information B to be encrypted as a ciphertext C in accordance with an encryption scheme that comprises an encrypt function; and at least one processor configured to encrypt the information B in accordance with the encrypt function of the encryption scheme to obtain the ciphertext C, where the encryption scheme utilizes at least one public key A corresponding to at least one private key T, where the information B, the ciphertext C, the at least one public key A and the at least one private key T are matrices, where the encrypt function receives as inputs the at least one public key A and the information B and outputs the ciphertext C as C←AS+pX+B(mod q), where S is a random matrix, where X is an error matrix, where p is in integer, where q is an odd prime number.

An apparatus as in any above, further comprising one or more additional aspects of the exemplary embodiments of the invention as described herein.

(3) In a further exemplary embodiment of the invention, and as shown in FIG. 3, a method comprising: receiving, by at least one processor, information B to be encrypted as a ciphertext C in accordance with an encryption scheme that comprises an encrypt function (301); and encrypting, by the at least one processor, the information B in accordance with the encrypt function of the encryption scheme to obtain the ciphertext C (302), where the encryption scheme utilizes at least one public key A corresponding to at least one private key T, where the information B, the ciphertext C, the at least one public key A and the at least one private key T are matrices, where the encrypt function receives as inputs the at least one public key A and the information B and outputs the ciphertext C as C←AS–pX–B(mod q), where S is a random matrix, where X is an error matrix, where p is in integer, where q is an odd prime number.

A method as in any above, further comprising one or more additional aspects of the exemplary embodiments of the invention as described herein.

(4) In another exemplary embodiment of the invention, an apparatus comprising: means for storing information B to be encrypted as a ciphertext C in accordance with an encryption scheme that comprises an encrypt function; and means for encrypting the information B in accordance with the encrypt function of the encryption scheme to obtain the ciphertext C, where the encryption scheme utilizes at least one public key A corresponding to at least one private key T, where the information B, the ciphertext C, the at least one public key A and the at least one private key T are matrices, where the encrypt function receives as inputs the at least one public key A and the information B and outputs the ciphertext C as C←AS+pX+B(mod q), where S is a random matrix, where X is an error matrix, where p is in integer, where q is an odd prime number.

An apparatus as above, where the means for storing comprises at least one storage medium, memory or memory medium and where the means for encrypting comprises at least one processor, at least one circuit or at least one integrated circuit. An apparatus as in any above, further comprising one or more additional aspects of the exemplary embodiments of the invention as described herein.

(5) In another exemplary embodiment of the invention, an apparatus comprising: storage circuitry configured to store information B to be encrypted as a ciphertext C in accordance with an encryption scheme that comprises an encrypt function; and encryption circuitry configured to encrypt the information B in accordance with the encrypt function of the encryption scheme to obtain the ciphertext C, where the encryption scheme utilizes at least one public key A corresponding to at least one private key T, where the information B, the ciphertext C, the at least one public key A and the at least one private key T are matrices, where the encrypt function receives as inputs the at least one public key A and the information B and outputs the ciphertext C as C←AS+pX+B(mod q), where S is a random matrix, where X is an error matrix, where p is in integer, where q is an odd prime number.

An apparatus as in any above, further comprising one or more additional aspects of the exemplary embodiments of the invention as described herein.

Figure 4:
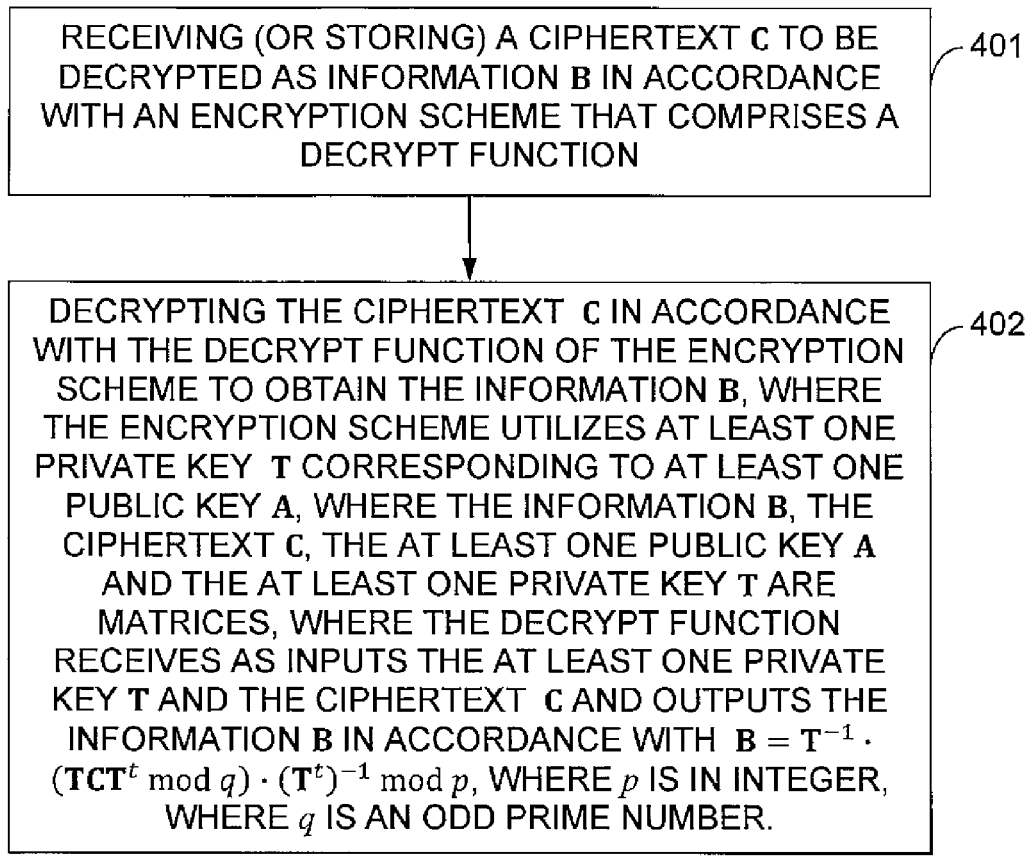
FIG. 4 depicts another logic flow diagram illustrative of the operation of an exemplary method, and the operation of an exemplary computer program, in accordance with the exemplary embodiments of this invention.

(6) In another exemplary embodiment of the invention, and as shown in FIG. 4, a computer readable storage medium tangibly embodying a program of instructions executable by a machine for performing operations, the operations comprising: receiving a ciphertext C to be decrypted as information B in accordance with an encryption scheme that comprises a decrypt function (401); and decrypting the ciphertext C in accordance with the decrypt function of the encryption scheme to obtain the information B (402), where the encryption scheme utilizes at least one private key T, where the information B, the ciphertext C and the at least one private key T are matrices, where the decrypt function receives as inputs the at least one private key T and the ciphertext C and outputs the information B in accordance with $B = T^{-1} \cdot (TCT^t \mod q) \cdot (T^t)^{-1} \mod p$, where p is in integer, where q is an odd prime number.

A computer readable storage medium as above, the operations further comprising: outputting the information B. A computer readable storage medium as in any above, where the at least one private key T corresponding to at least one public key A. A computer readable storage medium as in any above, where the at least one private key T is a symmetric key. A computer readable storage medium as in any above, further comprising one or more additional aspects of the exemplary embodiments of the invention as described herein.

(7) In another exemplary embodiment of the invention, an apparatus comprising: at least one storage medium configured to store a ciphertext C to be decrypted as information B in accordance with an encryption scheme that comprises a decrypt function; and at least one processor configured to decrypt the ciphertext C in accordance with the decrypt function of the encryption scheme to obtain the information B, where the encryption scheme utilizes at least one private key T, where the information B, the ciphertext C and the at least one private key T are matrices, where the decrypt function receives as inputs the at least one private key T and the ciphertext C and outputs the information B in accordance with $B = T^{-1} \cdot (TCT^t \mod q) \cdot (T^t)^{-1} \mod p$, where p is in integer, where q is an odd prime number.

An apparatus as in any above, further comprising one or more additional aspects of the exemplary embodiments of the invention as described herein.

(8) In a further exemplary embodiment of the invention, and as shown in FIG. 4, a method comprising: receiving a ciphertext C to be decrypted as information B in accordance with an encryption scheme that comprises a decrypt function (401); and decrypting the ciphertext C in accordance with the decrypt function of the encryption scheme to obtain the information B (402), where the encryption scheme utilizes at least one private key T, where the information B, the ciphertext C and the at least one private key T are matrices, where the decrypt function receives as inputs the at least one private key T and the ciphertext C and outputs the information B in accordance with $B = T^{-1} \cdot (TCT^t \mod q) \cdot (T^t)^{-1} \mod p$, where p is in integer, where q is an odd prime number.

A method as in any above, further comprising one or more additional aspects of the exemplary embodiments of the invention as described herein.

(9) In another exemplary embodiment of the invention, an apparatus comprising: means for storing a ciphertext C to be decrypted as information B in accordance with an encryption scheme that comprises a decrypt function; and means for decrypting the ciphertext C in accordance with the decrypt function of the encryption scheme to obtain the information B, where the encryption scheme utilizes at least one private key T, where the information B, the ciphertext C and the at least one private key T are matrices, where the decrypt function receives as inputs the at least one private key T and the ciphertext C and outputs the information B in accordance with $B = T^{-1} \cdot (TCT^t \mod q) \cdot (T^t)^{-1} \mod p$, where p is in integer, where q is an odd prime number.

An apparatus as above, where the means for storing comprises at least one storage medium, memory or memory medium and where the means for decrypting comprises at least one processor, at least one circuit or at least one integrated circuit. An apparatus as in any above, further comprising one or more additional aspects of the exemplary embodiments of the invention as described herein.

(10) In another exemplary embodiment of the invention, an apparatus comprising: storage circuitry configured to store a ciphertext C to be decrypted as information B in accordance with an encryption scheme that comprises a decrypt function; and decryption circuitry configured to decrypt the ciphertext C in accordance with the decrypt function of the encryption scheme to obtain the information B, where the encryption scheme utilizes at least one private key T, where the information B, the ciphertext C and the at least one private key T are matrices, where the decrypt function receives as inputs the at least one private key T and the ciphertext C and outputs the information B in accordance with $B = T^{-1} \cdot (TCT^t \mod q) \cdot (T^t)^{-1} \mod p$, where p is in integer, where q is an odd prime number.

An apparatus as in any above, further comprising one or more additional aspects of the exemplary embodiments of the invention as described herein.

(11) In a further exemplary embodiment of the invention, a computer readable storage medium tangibly embodying a program of instructions executable by a machine for performing operations, the operations comprising: receiving information B to be encrypted as a ciphertext C in accordance with an encryption scheme that comprises an encrypt function and a decrypt function; and encrypting the information B in accordance with the encrypt function of the encryption scheme to obtain the ciphertext C, where the encryption scheme utilizes at least one public key A and at least one private key T corresponding to the at least one public key A, where the information B, the ciphertext C, the at least one public key A and the at least one private key T are matrices, where $B \in \mathbb{Z}_p^{m \times m}$, $C \in \mathbb{Z}_q^{m \times m}$, $A \in \mathbb{Z}_q^{m \times n}$ and $T \in \mathbb{Z}_q^{m \times m}$, where n denotes a security parameter and m, q=poly(n), where q is an odd prime number, where p is in integer, where q>p, where the encrypt function receives as inputs A and B and outputs the ciphertext C as C←AS+pX+B(mod q), where S is a random matrix and $$S \xleftarrow{\$} \mathbb{Z}_q^{n \times m},$$

where X is an error matrix and $$X \xleftarrow{\$} \Psi_\beta(q)^{m \times m},$$

where $\Psi_\beta$ is an error distribution, where $\beta$ is a Gaussian error parameter given by $\beta=1/\text{poly}(n)$, where the decrypt function receives as inputs T and C and outputs the information B in accordance with $B=T^{-1} \cdot (TCT^t \mod q) \cdot (T^t)^{-1} \mod p$, where the encryption scheme is homomorphic and supports computing bilinear forms (e.g., polynomially many additions and one multiplication).

A computer readable storage medium as in any above, further comprising one or more additional aspects of the exemplary embodiments of the invention as described herein. A method, apparatus or computer program corresponding to the above-described computer readable storage medium.

(12) In another exemplary embodiment of the invention, a computer readable storage medium tangibly embodying a program of instructions executable by a machine for performing operations, the operations comprising: receiving at least one of first information $B_1$ to be encrypted as a first ciphertext $C_1$ in accordance with an encryption scheme that comprises an encrypt function and a decrypt function and a second ciphertext $C_2$ to be decrypted as second information $B_2$ in accordance with the encryption scheme; and at least one of encrypting the first information $B_1$ in accordance with the encrypt function of the encryption scheme to obtain the first ciphertext $C_1$ and decrypting the second ciphertext $C_2$ in accordance with the decrypt function of the encryption scheme to obtain the second information B where the encryption scheme utilizes at least one public key A and at least one private key T corresponding to the at least one public key A, where the information B, the ciphertext C, the at least one public key A and the at least one private key T are matrices, where the encrypt function receives as inputs the at least one public key A and the information B and outputs the ciphertext C as C←AS+pX+B(mod q), where S is a random matrix, where X is an error matrix, where p is in integer, where q is an odd prime number, where the decrypt function receives as inputs the at least one private key T and the ciphertext C and outputs the information B in accordance with $B=T^{-1} \cdot (TCT^t \mod q) \cdot (T^t)^{-1} \mod p$.

A computer readable storage medium as in any above, further comprising one or more additional aspects of the exemplary embodiments of the invention as described herein. A method, apparatus or computer program corresponding to the above-described computer readable storage medium.

Figure 5:
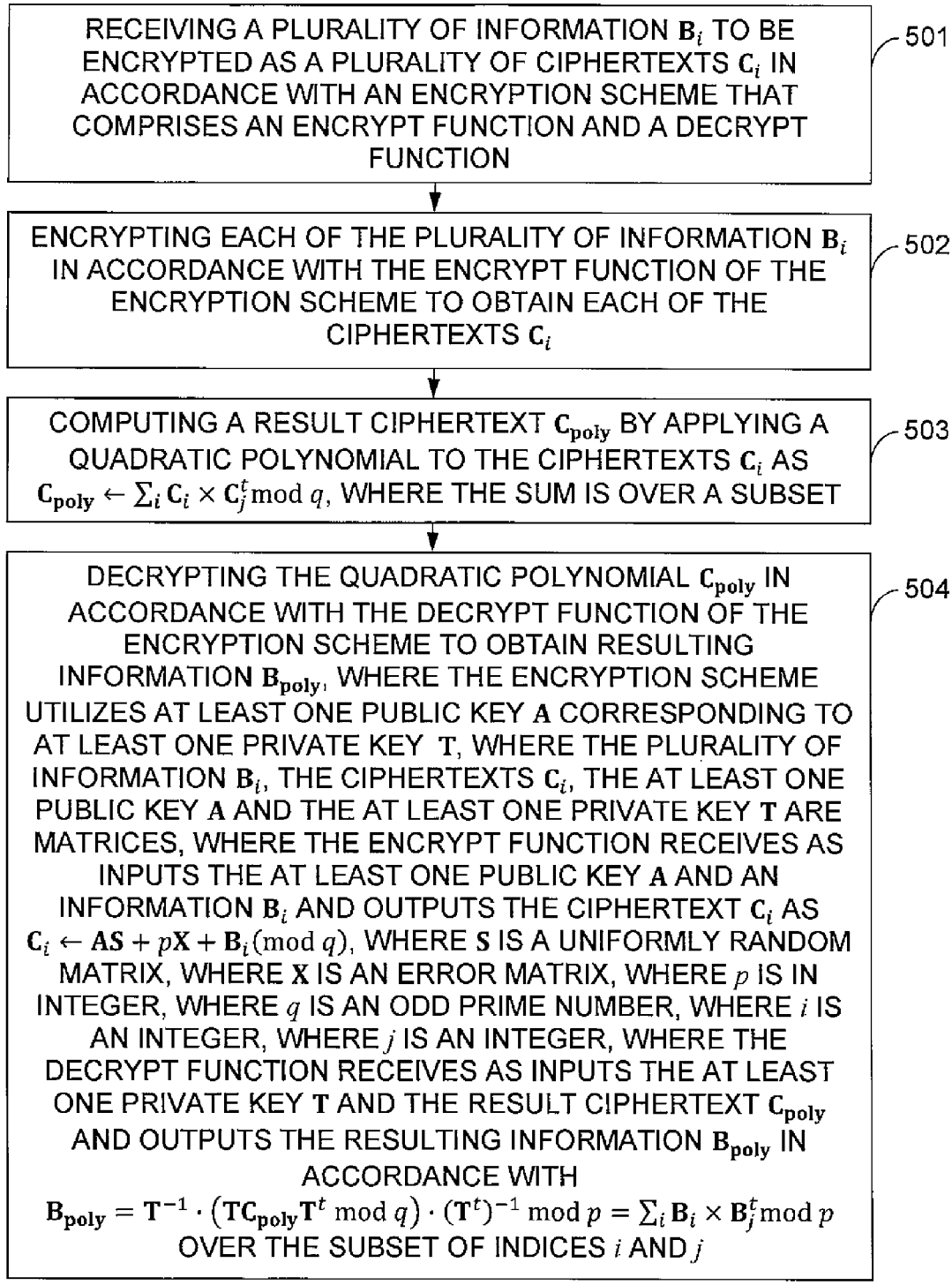
FIG. 5 depicts another logic flow diagram illustrative of the operation of an exemplary method, and the operation of an exemplary computer program, in accordance with the exemplary embodiments of this invention.

(13) In another exemplary embodiment of the invention, and as shown in FIG. 5, a computer readable storage medium tangibly embodying a program of instructions executable by a machine for performing operations, the operations comprising: receiving a plurality of information $B_i$ to be encrypted as a plurality of ciphertexts $C_i$ in accordance with an encryption scheme that comprises an encrypt function and a decrypt function (501); encrypting each of the plurality of information $B_i$ in accordance with the encrypt function of the encryption scheme to obtain each of the ciphertexts $C_i$ (502); computing a result ciphertext $C_{poly}$ by applying a quadratic polynomial to the ciphertexts $C_i$ as $C_{poly} \leftarrow \Sigma_i C_i + C_j^t \mod q$, where the sum is over a subset of indices i and j (503); and decrypting the result ciphertext $C_{poly}$ in accordance with the decrypt function of the encryption scheme to obtain resulting information $B_{poly}$ (504), where the encryption scheme utilizes at least one public key A corresponding to at least one private key T, where the plurality of information $B_i$, the ciphertexts $C_i$, the at least one public key A and the at least one private key T are matrices, where the encrypt function receives as inputs the at least one public key A and an information $B_i$ and outputs the ciphertext $C_i$ as $C_i \leftarrow AS+pX+B_i(\mod q)$, where S is a random matrix, where X is an error matrix, where p is in integer, where q is an odd prime number, where i is an integer, where j is an integer, where the decrypt function receives as inputs the at least one private key T and the result ciphertext $C_{poly}$ and outputs the resulting information $B_{poly}$ in accordance with $B_{poly}=T^{-1} \cdot (TC_{poly}T^t \mod q) \cdot (T^t)^{-1} \mod p = \Sigma_i B_i \times B_j^t \mod p$ over the subset of indices i and j.

A computer readable storage medium as in any above, further comprising one or more additional aspects of the exemplary embodiments of the invention as described herein. A method, apparatus or computer program corresponding to the above-described computer readable storage medium.

(14) In another exemplary embodiment of the invention, a computer readable storage medium tangibly embodying a program of instructions executable by a machine for performing operations, the operations comprising: receiving a ciphertext C to be decrypted as information B in accordance with an encryption scheme that comprises a decrypt function; and decrypting the ciphertext C in accordance with the decrypt function of the encryption scheme to obtain the information B, where the encryption scheme utilizes at least one private key T, where the information B, the ciphertext C and the at least one private key T are matrices, where the decrypt function receives as inputs the at least one private key T and the ciphertext C and outputs the information B in accordance with $B=T^{-1} \cdot (TC \mod q) \mod p$, where p is in integer, where q is an odd prime number.

A computer readable storage medium as in any above, further comprising one or more additional aspects of the exemplary embodiments of the invention as described herein. A method, apparatus or computer program corresponding to the above-described computer readable storage medium.

(15) In another exemplary embodiment of the invention, an apparatus comprising: at least one storage medium configured to store a ciphertext C to be decrypted as information B in accordance with an encryption scheme that comprises a decrypt function; and at least one processor configured to decrypt the ciphertext C in accordance with the decrypt function of the encryption scheme to obtain the information B, where the encryption scheme utilizes at least one private key T, where the information B, the ciphertext C and the at least one private key T are matrices, where the decrypt function receives as inputs the at least one private key T and the ciphertext C and outputs the information B in accordance with $B=T^{-1} \cdot (TC \mod q) \mod p$, where p is in integer, where q is an odd prime number.

An apparatus as in any above, further comprising one or more additional aspects of the exemplary embodiments of the invention as described herein.

Figure 6:
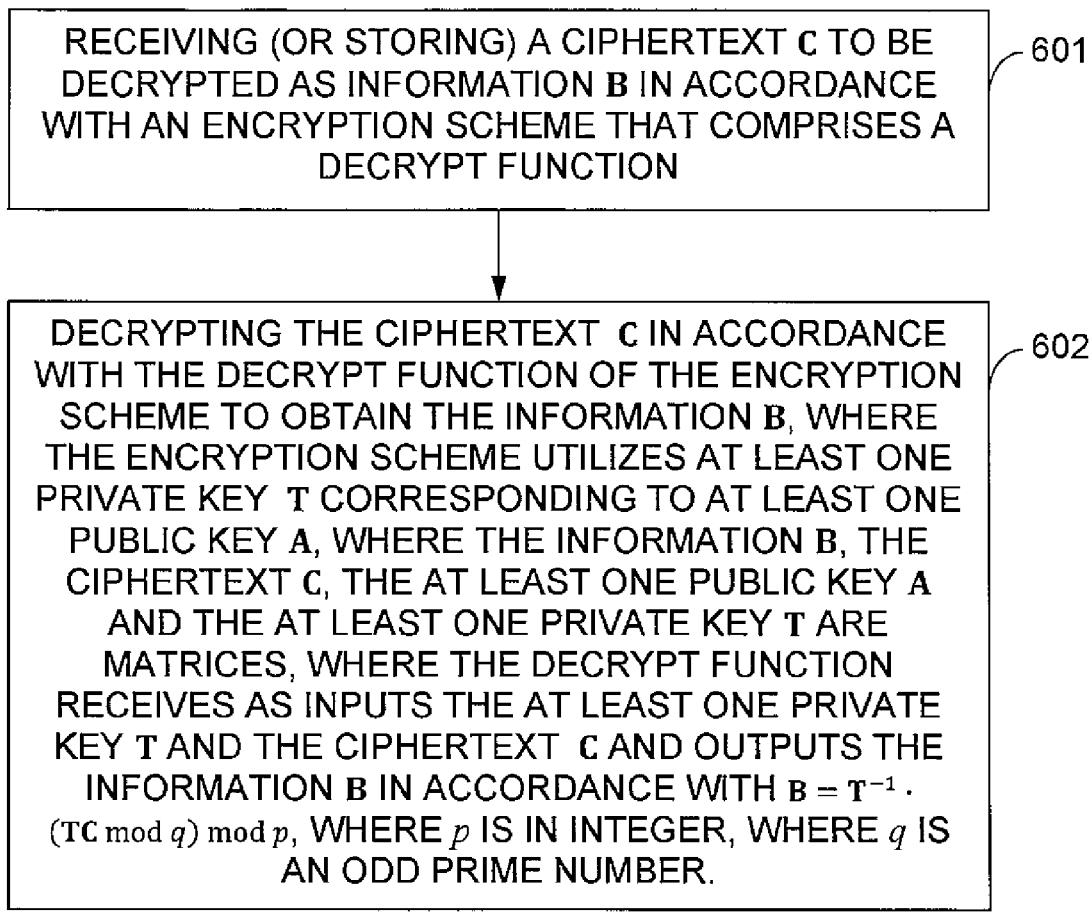
FIG. 6 depicts another logic flow diagram illustrative of the operation of an exemplary method, and the operation of an exemplary computer program, in accordance with the exemplary embodiments of this invention.

(16) In a further exemplary embodiment of the invention, and as shown in FIG. 6, a method comprising: receiving a ciphertext C to be decrypted as information B in accordance with an encryption scheme that comprises a decrypt function (601); and decrypting the ciphertext C in accordance with the decrypt function of the encryption scheme to obtain the information B (602), where the encryption scheme utilizes at least one private key T, where the information B, the ciphertext C and the at least one private key T are matrices, where the decrypt function receives as inputs the at least one private key T and the ciphertext C and outputs the information B in accordance with $B=T^{-1} \cdot (TC \bmod q) \bmod p$, where p is in integer, where q is an odd prime number.

A method as in any above, further comprising one or more additional aspects of the exemplary embodiments of the invention as described herein.

(17) In another exemplary embodiment of the invention, an apparatus comprising: means for storing a ciphertext C to be decrypted as information B in accordance with an encryption scheme that comprises a decrypt function; and means for decrypting the ciphertext C in accordance with the decrypt function of the encryption scheme to obtain the information B, where the encryption scheme utilizes at least one private key T, where the information B, the ciphertext C and the at least one private key T are matrices, where the decrypt function receives as inputs the at least one private key T and the ciphertext C and outputs the information B in accordance with $B=T^{-1} \cdot (TC \bmod q) \bmod p$, where p is in integer, where q is an odd prime number.

An apparatus as above, where the means for storing comprises at least one storage medium, memory or memory medium and where the means for decrypting comprises at least one processor, at least one circuit or at least one integrated circuit. An apparatus as in any above, further comprising one or more additional aspects of the exemplary embodiments of the invention as described herein.

(18) In another exemplary embodiment of the invention, an apparatus comprising: storage circuitry configured to store a ciphertext C to be decrypted as information B in accordance with an encryption scheme that comprises a decrypt function; and decryption circuitry configured to decrypt the ciphertext C in accordance with the decrypt function of the encryption scheme to obtain the information B, where the encryption scheme utilizes at least one private key T, where the information B, the ciphertext C and the at least one private key T are matrices, where the decrypt function receives as inputs the at least one private key T and the ciphertext C and outputs the information B in accordance with $B=T^{-1} \cdot (TC \bmod q) \bmod p$, where p is in integer, where q is an odd prime number.

An apparatus as in any above, further comprising one or more additional aspects of the exemplary embodiments of the invention as described herein.

(19) In a further exemplary embodiment of the invention, a computer readable storage medium tangibly embodying a program of instructions executable by a machine for performing operations, the operations comprising: receiving information B to be encrypted as a ciphertext C in accordance with an encryption scheme that comprises an encrypt function and a decrypt function; and encrypting the information B in accordance with the encrypt function of the encryption scheme to obtain the ciphertext C, where the encryption scheme utilizes at least one public key A and at least one private key T corresponding to the at least one public key A, where the information B, the ciphertext C, the at least one public key A and the at least one private key T are matrices, where $B \in \mathbb{Z}_p^{m \times m}$, $C \in \mathbb{Z}_q^{m \times m}$, $A \in \mathbb{Z}_q^{m \times n}$ and $T \in \mathbb{Z}_q^{m \times m}$, where n denotes a security parameter and m,q=poly(n), where q is an odd prime number, where p is in integer, where q>p, where the encrypt function receives as inputs A and B and outputs the ciphertext C as $C \leftarrow AS+pX+B(\bmod q)$, where S is a random matrix and $$S \xleftarrow{\$} \mathbb{Z}_q^{n \times m},$$

where X is an error matrix and $$X \xleftarrow{\$} \bar{\Psi}_\beta(q)^{m \times m},$$

where $\Psi_\beta$ is an error distribution, where $\beta$ is a Gaussian error parameter given by $\beta=1/\text{poly}(n)$, where the decrypt function receives as inputs T and C and outputs the information B in accordance with $B=T^{-1} \cdot (TC \bmod q) \bmod p$, where the encryption scheme is homomorphic and supports polynomially many additions.

A computer readable storage medium as in any above, further comprising one or more additional aspects of the exemplary embodiments of the invention as described herein. A method, apparatus or computer program corresponding to the above-described computer readable storage medium.

(20) In another exemplary embodiment of the invention, a computer readable storage medium tangibly embodying a program of instructions executable by a machine for performing operations, the operations comprising: receiving at least one of first information $B_1$ to be encrypted as a first ciphertext $C_1$ in accordance with an encryption scheme that comprises an encrypt function and a decrypt function and a second ciphertext $C_2$ to be decrypted as second information $B_2$ in accordance with the encryption scheme; and at least one of encrypting the first information $B_1$ in accordance with the encrypt function of the encryption scheme to obtain the first ciphertext $C_1$ and decrypting the second ciphertext $C_2$ in accordance with the decrypt function of the encryption scheme to obtain the second information $B_2$, where the encryption scheme utilizes at least one public key A and at least one private key T corresponding to the at least one public key A, where the information B, the ciphertext C, the at least one public key A and the at least one private key T are matrices, where the encrypt function receives as inputs the at least one public key A and the information B and outputs the ciphertext C as $C \leftarrow AS+pX+B(\bmod q)$, where S is a random matrix, where X is an error matrix, where p is in integer, where q is an odd prime number, where the decrypt function receives as inputs the at least one private key T and the ciphertext C and outputs the information B in accordance with $B=T^{-1} \cdot (TC \bmod q) \bmod p$.

A computer readable storage medium as in any above, further comprising one or more additional aspects of the exemplary embodiments of the invention as described herein. A method, apparatus or computer program corresponding to the above-described computer readable storage medium.

Figure 7:
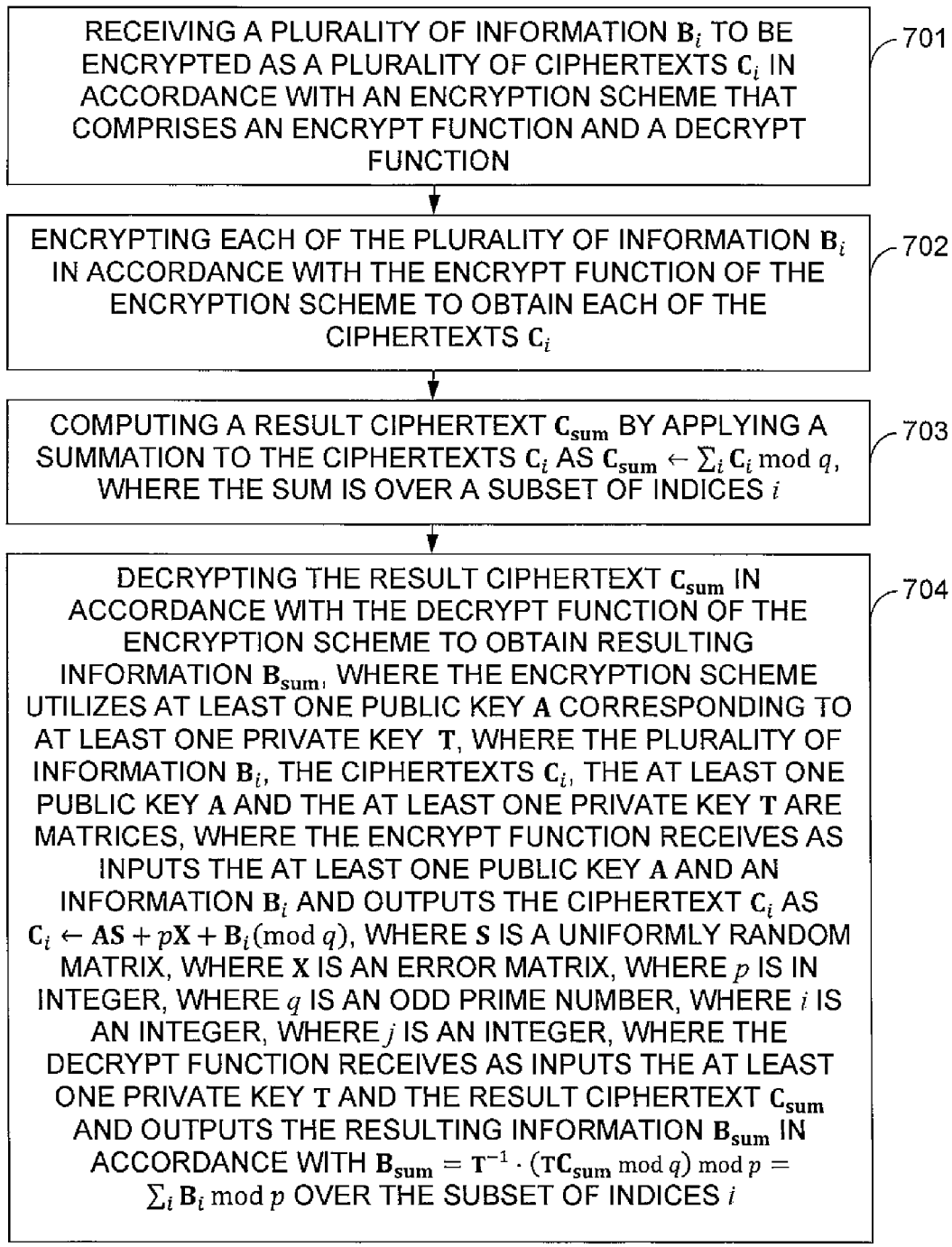
FIG. 7 depicts another logic flow diagram illustrative of the operation of an exemplary method, and the operation of an exemplary computer program, in accordance with the exemplary embodiments of this invention.

(21) In another exemplary embodiment of the invention, and as shown in FIG. 7, a computer readable storage medium tangibly embodying a program of instructions executable by a machine for performing operations, the operations comprising: receiving a plurality of information $B_i$ to be encrypted as a plurality of ciphertexts $C_i$ in accordance with an encryption scheme that comprises an encrypt function and a decrypt function (701); encrypting each of the plurality of information $B_i$ in accordance with the encrypt function of the encryption scheme to obtain each of the ciphertexts $C_i$ (702); computing a result ciphertext $C_{sum}$ by applying a summation to the ciphertexts $C_i$ as $C_{sum} \leftarrow \Sigma_i C_i \bmod q$, where the sum is over a subset of indices i (703); and decrypting the result ciphertext $C_{sum}$ in accordance with the decrypt function of the encryption scheme to obtain resulting information $B_{sum}$ (704), where the encryption scheme utilizes at least one public key A corresponding to at least one private key T, where the plurality of information $B_1$, the ciphertexts $C_1$, the at least one public key A and the at least one private key T are matrices, where the encrypt function receives as inputs the at least one public key A and an information $B_1$ and outputs the ciphertext $C_i$ as $C_i \leftarrow AS+pX+B_i(\mod q)$, where S is a random matrix, where X is an error matrix, where p is in integer, where q is an odd prime number, where i is an integer, where j is an integer, where the decrypt function receives as inputs the at least one private key T and the result ciphertext $C_{sum}$ and outputs the resulting information $B_{sum}$ in accordance with $B_{sum}=T^- \cdot (TC_{sum} \mod q) \mod p = \Sigma_i B_i \mod p$ over the subset of indices i.

A computer readable storage medium as in any above, further comprising one or more additional aspects of the exemplary embodiments of the invention as described herein. A method, apparatus or computer program corresponding to the above-described computer readable storage medium.

The exemplary embodiments of the invention as discussed herein may be implemented in conjunction with a program storage device (e.g., at least one memory, at least one computer readable storage medium) readable (e.g., by a machine, by a computer, by a processor), tangibly embodying (e.g., storing) a program of instructions (e.g., a program, a computer program, program code, program instructions) executable by a/the machine (or computer or processor) for performing operations. The operations comprise steps of utilizing (e.g., practicing) the exemplary embodiments of the invention or steps of the method.

The blocks shown in FIGS. 3-7 further may be considered to correspond to one or more functions and/or operations that are performed by one or more components, circuits, chips, apparatus, processors, computer programs and/or function blocks. Any and/or all of the above may be implemented in any practicable solution or arrangement that enables operation in accordance with the exemplary embodiments of the invention as described herein.

In addition, the arrangement of the blocks depicted in FIGS. 3-7 should be considered merely exemplary and non-limiting. It should be appreciated that the blocks shown in FIGS. 3-7 may correspond to one or more functions and/or operations that may be performed in any order (e.g., any suitable, practicable and/or feasible order) and/or concurrently (e.g., as suitable, practicable and/or feasible) so as to implement one or more of the exemplary embodiments of the invention. In addition, one or more additional functions, operations and/or steps may be utilized in conjunction with those shown in FIGS. 3-7 so as to implement one or more further exemplary embodiments of the invention.

That is, the exemplary embodiments of the invention shown in FIGS. 3-7 may be utilized, implemented or practiced in conjunction with one or more further aspects in any combination (e.g., any combination that is suitable, practicable and/or feasible) and are not limited only to the steps, blocks, operations and/or functions shown in FIGS. 3-7.

The flowchart and block diagrams in FIGS. 3-7 illustrate the architecture, functionality, and operation of possible exemplary implementations of systems, methods and computer program products according to various exemplary embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions, as non-limiting examples.

Still further, the various names used for the parameters, operations and functions described herein are not intended to be limiting in any respect, as these parameters, operations and functions may be identified by any suitable name.

The corresponding structures, materials, acts, and equivalents of any and all means or step plus function elements described herein are intended to include any structure, material, or act for performing the function in combination with other claimed elements as specifically claimed. The description of the exemplary embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The exemplary embodiment was chosen and described in order to best explain the principles of the exemplary embodiments of the invention and the practical applications, and to enable others of ordinary skill in the art to understand the invention for various exemplary embodiments with various modifications as are suited to the particular use(s) contemplated.

As will be appreciated by one skilled in the art, aspects of the exemplary embodiments of the invention may be embodied as a system, method or computer program product, as non-limiting examples. Accordingly, aspects of the exemplary embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system," as non-limiting examples. Furthermore, aspects of the exemplary embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. As non-limiting examples, a computer readable storage medium may comprise one or more of: an electronic, magnetic, optical, electromagnetic, infrared, or semiconductor system, apparatus, or device, or any suitable combination of the foregoing. More specific non-limiting examples of a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that is configured/operable to contain or store a program for use by or in connection with an instruction execution system, apparatus, or device (e.g., a computer or a processor).

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to: wireless, wireline, wired, optical fiber cable, RF, or any suitable combination of the foregoing.

Computer program code for carrying out operations for aspects of the exemplary embodiments of the invention may be written in any combination of one or more programming languages, including an object oriented programming language such as Java, Smalltalk or C++ and conventional procedural programming languages, such as the "C" programming language or similar programming languages, as non-limiting examples. The program code may execute entirely on the user's computer, partly on the user's computer, as a stand-alone software package, partly on the user's computer and partly on a remote computer or entirely on the remote computer or server, as non-limiting examples. In the latter scenario, the remote computer may be connected to the user's computer through any type of network, including a local area network (LAN) or a wide area network (WAN), or the connection may be made to an external computer (for example, through the Internet using an Internet Service Provider), as non-limiting examples.

Aspects of the exemplary embodiments of the invention are described herein with reference to flowchart illustrations and/or block diagrams of methods, apparatus (systems) and computer program products according to various exemplary embodiments of the invention. It will be understood that each block of the flowchart illustrations and/or block diagrams, and combinations of blocks in the flowchart illustrations and/or block diagrams, can be implemented by computer program instructions, as a non-limiting examples. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks, as non-limiting examples.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks (e.g., exemplary embodiments of the invention).

Any use of the terms "connected," "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications will still fall within the scope of the teachings of the exemplary embodiments of the invention.

Furthermore, some of the features of the preferred embodiments of this invention could be used to advantage without the corresponding use of other features. As such, the foregoing description should be considered as merely illustrative of the principles of the invention, and not in limitation thereof

6 References

[1] C. Aguilar Melchor, G. Castagnos, and P. Gaborit. Lattice-based homomorphic encryption of vector spaces. In *IEEE International Symposium on Information Theory, ISIT'2008*, pages 1858-1862, 2008.

[2] C. Aguilar Melchor, P. Gaborit, and H. Javier. Additive Homomorphic Encryption with t-Operand Multiplications. Technical Report 2008/378, IACR ePrint archive, 2008. http://eprint.iacr.org/2008/378/.

[3] M. Ajtai. Generating hard instances of the short basis problem. In *ICALP*, pages 1 {9, 1999.

[4] J. Alwen and C. Peikert. Generating shorter bases for hard random lattices. In *STACS*, pages 75-86, 2009.

[5] D. Boneh, E.-J. Goh, and K. Nissim. Evaluating 2-DNF formulas on ciphertexts. Pages 325-341, 2005.

[6] Y. Dodis, S. Goldwasser, Y. T. Kalai, C. Peikert, and V. Vaikuntanathan. Public-key encryption schemes with auxiliary inputs. In *TCC*, pages 361-381, 2010.

[7] W. Feller. *An Introduction to Probability Theory and Its Applications, Volume* 1. Wiley, 1968.

[8] C. Gentry. *A fully homomorphic encryption scheme*. PhD thesis, Stanford University, 2009. http://crypto.stanford.edu/craig.

[9] C. Gentry. Fully homomorphic encryption using ideal lattices. In *STOC '09*, pages 169-178. ACM, 2009.

[10] C. Gentry, C. Peikert, and V. Vaikuntanathan. Trapdoors for hard lattices and new cryptographic constructions. In *STOC*, pages 197-206, 2008.

[11] A. Kawachi, K. Tanaka, and K. Xagawa. Multi-bit Cryptosystems Based on Lattice Problems. In *Public Key Cryptography (PKC'07)*, volume 4450 of *Lecture Notes in Computer Science*, pages 315-329. Springer, 2007.

[12] Y. Lindell and B. Pinkas. A proof of security of yao's protocol for two-party computation. *J. Cryptology*, 22(2), 2009.

[13] C. Peikert. Public-key cryptosystems from the worst-case shortest vector problem. In *STOC'09*, pages 333-342. ACM, 2009.

[14] O. Regev. On lattices, learning with errors, random linear codes, and cryptography. *J. ACM*, 56(6), 2009. Preliminiary version in STOC'05.

[15] T. Sander, A. Young, and M. Yung. Non-interactive CryptoComputing for NC1. In $40^{th}$ *Annual Symposium on Foundations of Computer Science*, pages 554-567. IEEE, 1999.

[16] A. C. Yao. Protocols for secure computations (extended abstract). In *23rd Annual Symposium on Foundations of Computer Science—FOCS '82*, pages 160-164. IEEE, 1982.

What is claimed is:

1. An apparatus comprising:
   at least one storage medium configured to store information B to be encrypted as a ciphertext C in accordance with an encryption scheme that comprises an encrypt function; and
   at least one processor configured to use an encryption scheme that is homomorphic and supports computing bilinear forms, the at least one processor configured to encrypt the information B in accordance with the encrypt function of the encryption scheme to obtain the ciphertext C,
   where the encryption scheme utilizes at least one public key A, where the information B, the ciphertext C, and the at least one public key A are matrices,
   where the encrypt function receives as inputs the at least one public key A and the information B and outputs the ciphertext C as C←AS+pX+B(mod q), where S is a random matrix, where X is an error matrix, where p is an integer, where q is an odd prime number; and
   wherein the at least one processor is further configured to output the ciphertext C, to send the outputted ciphertext over a network to a remote computer which uses the outputted ciphertext in one or more homomorphic operations, and to receive a result of the one or more homomorphic operations from the remote computer, and wherein the at least one processor is further configured to perform decryption of the result of the one or more homomorphic operations received from the remote computer to create plaintext.

2. The apparatus of claim 1, where $B \in \mathbb{Z}_p^{m \times m}$, $C \in \mathbb{Z}_q^{m \times m}$, $A \in \mathbb{Z}_q^{m \times n}$, $$S \xleftarrow{\$} \mathbb{Z}_q^{n \times m}$$

and $$X \xleftarrow{\$} \Psi_\beta(q)^{m \times m},$$

where n denotes a security parameter and m, q=poly(n), where $\Psi_\beta$ is an error distribution, where $\beta$ is a Gaussian error parameter given by $\beta=1/\text{poly}(n)$.

3. The apparatus of claim 1, where p=2 and the information B comprises a matrix of binary values.

4. The apparatus of claim 1, where=c(n)>0, $q>2^{20}p^2(c+4)^3 n^{3c+4} \log^5 n$, $m = \lfloor 8n \log q \rfloor$ and $$\beta = \frac{1}{27pn^{1+(3c/2)}\log n \log q \sqrt{qm}}.$$

5. The apparatus of claim 4, where the encryption scheme supports $n^c$ additions and one multiplication in any order over a matrix ring $\mathbb{Z}_p^{m \times m}$.

6. A method, comprising:
   receiving, by a computer, information B to be encrypted as a ciphertext C in accordance with an encryption scheme that comprises an encrypt function; and
   using, by the computer, an encryption scheme that is homomorphic and supports computing bilinear forms at least by encrypting the information B in accordance with the encrypt function of the encryption scheme to obtain the ciphertext C,
   where the encryption scheme utilizes at least one public key A, where the information B, the ciphertext C, and the at least one public key A are matrices,
   where the encrypt function receives as inputs the at least one public key A and the information B and outputs the ciphertext C as C←AS+pX+B(mod q), where S is a random matrix, where X is an error matrix, where p is an integer, where q is an odd prime number;
   outputting by the computer the ciphertext C, sending the outputted ciphertext over a network to a remote computer which uses the outputted ciphertext in one or more homomorphic operations, receiving a result of the one or more homomorphic operations from the remote computer, and decrypting the result of the one or more homomorphic operations received from the remote computer to create plaintext.

7. The method of claim 6, where $B \in \mathbb{Z}_p^{m \times m}$, $C \in \mathbb{Z}_q^{m \times m}$, $A \in \mathbb{Z}_q^{m \times n}$, $$S \xleftarrow{\$} \mathbb{Z}_q^{n \times m}$$

and $$X \xleftarrow{\$} \Psi_\beta(q)^{m \times m},$$

where n denotes a security parameter and m, q=poly(n), where $\Psi_\beta$ is an error distribution, where $\beta$ is a Gaussian error parameter given by $\beta=1/\text{poly}(n)$.

8. The method of claim 6, where p=2 and the information B comprises a matrix of binary values.

9. The method of claim 6, where=c(n)>0, $q>2^{20}p^2(c+4)^3 n^{3c+4} \log^5 n$, $m = \lfloor 8n \log q \rfloor$ and $$\beta = \frac{1}{27pn^{1+(3c/2)}\log n \log q \sqrt{qm}}.$$

10. The method of claim 9, where the encryption scheme supports $n^c$ additions and one multiplication in any order over a matrix ring $\mathbb{Z}_p^{m \times m}$.

11. The apparatus of claim 1, wherein the at least one processor is further configured to encrypt additional information in accordance with the encrypt function of the encryption scheme to obtain additional ciphertexts, wherein the one or more homomorphic operations comprise a plurality of additions performed using the ciphertext C and the additional ciphertexts.

12. The apparatus of claim 11, wherein the one or more homomorphic operations further comprise a single multiplication using the ciphertext C and another ciphertext.

13. The method of claim 6, further comprising encrypting additional information in accordance with the encrypt function of the encryption scheme to obtain additional ciphertexts, wherein the one or more homomorphic operations comprise a plurality of additions performed using the ciphertext C and the additional ciphertexts.

14. The method of claim 13, wherein the one or more homomorphic operations further comprise a single multiplication using the ciphertext C and another ciphertext.

15. A computer readable storage device tangibly embodying a program of instructions executable by a computer for performing operations, the operations comprising:
receiving, by the computer, information B to be encrypted as a ciphertext C in accordance with an encryption scheme that comprises an encrypt function; and
using, by the computer, an encryption scheme that is homomorphic and supports computing bilinear forms at least by encrypting the information B in accordance with the encrypt function of the encryption scheme to obtain the ciphertext C,
where the encryption scheme utilizes at least one public key A, where the information B, the ciphertext C, and the at least one public key A are matrices,
where the encrypt function receives as inputs the at least one public key A and the information B and outputs the ciphertext C as C←AS+pX+B(mod q), where S is a random matrix, where X is an error matrix, where p is an integer, where q is an odd prime number;
outputting by the computer the ciphertext C, sending the outputted ciphertext over a network to a remote computer which uses the outputted ciphertext in one or more homomorphic operations, receiving a result of the one or more homomorphic operations from the remote computer, and decrypting the result of the one or more homomorphic operations received from the remote computer to create plaintext.

16. The computer readable storage device of claimer 17 where $B \in \mathbb{Z}_p^{m \times m}$, $C \in \mathbb{Z}_q^{m \times m}$, $A \in \mathbb{Z}_q^{m \times n}$, $$S \xleftarrow{\$} \mathbb{Z}_q^{n \times m}$$

and $$X \xleftarrow{\$} \Psi_\beta(q)^{m \times m},$$

where n denotes a security parameter and m, q=poly(n), where $\Psi_\beta$ is an error distribution, where $\beta$ is a Gaussian error parameter given by $\beta=1/\text{poly}(n)$.

17. The computer readable storage device of claim 15, where p=2 and the information B comprises a matrix of binary values.

18. The computer readable storage device of claim 15, where=c(n)>0, $q > 2^{20} p^2 (c+4)^3 n^{3c+4} \log^5 n$, $m = \lfloor 8n \log q \rfloor$ and $$\beta = \frac{1}{27 p n^{1+(3c/2)} \log n \log q \sqrt{qm}}.$$

* * * * *